(12) United States Patent
Jones et al.

(10) Patent No.: US 7,613,904 B2
(45) Date of Patent: Nov. 3, 2009

(54) INTERFACING EXTERNAL THREAD PRIORITIZING POLICY ENFORCING LOGIC WITH CUSTOMER MODIFIABLE REGISTER TO PROCESSOR INTERNAL SCHEDULER

(75) Inventors: Darren M. Jones, Los Altos, CA (US); Ryan C. Kinter, Sammamish, WA (US); Kevin D. Kissell, Le Bar sur Loup (FR); Thomas A. Petersen, San Francisco, CA (US)

(73) Assignee: MIPS Technologies, Inc., Sunnyvale, CA (US)

( * ) Notice: Subject to any disclaimer, the term of this patent is extended or adjusted under 35 U.S.C. 154(b) by 199 days.

(21) Appl. No.: 11/051,997

(22) Filed: Feb. 4, 2005

(65) Prior Publication Data

US 2006/0179279 A1    Aug. 10, 2006

(51) Int. Cl.
  *G06F 9/50* (2006.01)
(52) U.S. Cl. .................................. 712/214; 718/103
(58) Field of Classification Search ................... None
  See application file for complete search history.

(56) References Cited

U.S. PATENT DOCUMENTS

| | | |
|---|---|---|
| 4,126,895 A | 11/1978 | Weemaes et al. |
| 4,924,380 A | 5/1990 | McKinney et al. |
| 5,095,460 A | 3/1992 | Rodeheffer |
| 5,276,887 A | 1/1994 | Haynie |
| 5,309,382 A | 5/1994 | Tamura et al. |
| 5,357,512 A | 10/1994 | Khaira et al. |
| 5,528,513 A | 6/1996 | Vaitzblit et al. |
| 5,546,554 A | 8/1996 | Yung et al. |
| 5,734,877 A | 3/1998 | Ries et al. |
| 5,745,778 A | 4/1998 | Alfieri |
| 5,793,993 A | 8/1998 | Broedner et al. |
| 5,832,278 A | 11/1998 | Pham |

(Continued)

FOREIGN PATENT DOCUMENTS

DE     10110504     10/2001

(Continued)

OTHER PUBLICATIONS

Shen & Lipasti; Modern Processor Design: Fundamentals of Superscalar Processor; 2003; McGraw-Hill Companies, Inc; Beta Edition; pp. 252, 281, 283-285.

(Continued)

*Primary Examiner*—Kenneth S Kim
(74) *Attorney, Agent, or Firm*—Sterne, Kessler, Goldstein & Fox P.L.L.C.

(57) ABSTRACT

A bifurcated instruction scheduler for dispatching instructions of multiple threads concurrently executing in a multi-threading processor is provided. The scheduler includes a first portion within a reusable core that is not customizable by a customer, a second portion outside the core that is customizable, and an interface coupling the second portion to the core. The second portion implements a thread scheduling policy that may be customized to the customer's particular application. The first portion may be scheduling policy-agnostic and issues instructions of the threads each clock cycle to execution units based on the scheduling policy communicated by the second portion. The second portion communicates the scheduling policy via a priority for each of the threads. When the core commits an instruction for execution, the core communicates to the second portion which thread the committed instruction is in to enable the second portion to update the priorities in response thereto.

91 Claims, 15 Drawing Sheets

U.S. PATENT DOCUMENTS

| | | | |
|---|---|---|---|
| 5,860,000 | A | 1/1999 | Biswas et al. |
| 5,898,694 | A | 4/1999 | Ilyadis et al. |
| 5,913,049 | A | 6/1999 | Shiell et al. |
| 5,938,742 | A | 8/1999 | Faddell et al. |
| 6,032,218 | A | 2/2000 | Lewin et al. |
| 6,073,159 | A | 6/2000 | Emer et al. |
| 6,076,157 | A | 6/2000 | Borkenhagen et al. |
| 6,094,435 | A | 7/2000 | Hoffman et al. |
| 6,101,193 | A | 8/2000 | Ohba |
| 6,105,051 | A | 8/2000 | Borkenhagen et al. |
| 6,105,053 | A | 8/2000 | Kimmel et al. |
| 6,105,127 | A * | 8/2000 | Kimura et al. ............... 712/215 |
| 6,163,827 | A | 12/2000 | Viswanadham et al. |
| 6,170,051 | B1 | 1/2001 | Dowling |
| 6,212,544 | B1 | 4/2001 | Borkenhagen et al. |
| 6,237,081 | B1 | 5/2001 | Le et al. |
| 6,272,520 | B1 | 8/2001 | Sharangpani et al. |
| 6,272,579 | B1 | 8/2001 | Lentz et al. |
| 6,295,600 | B1 | 9/2001 | Parady |
| 6,385,715 | B1 | 5/2002 | Merchant et al. |
| 6,389,449 | B1 | 5/2002 | Nemirovsky et al. |
| 6,434,155 | B1 | 8/2002 | Jones et al. |
| 6,470,016 | B1 | 10/2002 | Kalkunte et al. |
| 6,477,562 | B2 | 11/2002 | Nemirovsky et al. |
| 6,516,369 | B1 | 2/2003 | Bredin |
| 6,542,921 | B1 | 4/2003 | Sager |
| 6,549,930 | B1 | 4/2003 | Chrysos et al. |
| 6,556,571 | B1 | 4/2003 | Shahrier et al. |
| 6,563,818 | B1 | 5/2003 | Sang et al. |
| 6,567,839 | B1 | 5/2003 | Borkenhagen et al. |
| 6,609,190 | B1 | 8/2003 | Kahle et al. |
| 6,633,939 | B2 | 10/2003 | Butta' et al. |
| 6,647,449 | B1 | 11/2003 | Watts |
| 6,658,447 | B2 | 12/2003 | Cota-Robles |
| 6,665,760 | B1 | 12/2003 | Dotson |
| 6,694,425 | B1 | 2/2004 | Eickemeyer |
| 6,721,874 | B1 | 4/2004 | Le et al. |
| 6,754,736 | B1 | 6/2004 | Ogawa et al. |
| 6,792,446 | B2 | 9/2004 | Merchant et al. |
| 6,810,426 | B2 | 10/2004 | Mysore et al. |
| 6,868,529 | B1 | 3/2005 | Frannhagen |
| 6,918,116 | B2 * | 7/2005 | Ang ............................ 718/102 |
| 6,987,517 | B1 | 1/2006 | Donovan et al. |
| 7,007,153 | B1 | 2/2006 | Berenbaum et al. |
| 7,015,913 | B1 | 3/2006 | Lindholm et al. |
| 7,035,997 | B1 | 4/2006 | Musoll et al. |
| 7,051,189 | B2 | 5/2006 | Warnes |
| 7,096,470 | B2 | 8/2006 | Brown et al. |
| 7,120,714 | B2 | 10/2006 | O'Connor et al. |
| 7,139,898 | B1 | 11/2006 | Nemirovsky et al. |
| 7,185,178 | B1 | 2/2007 | Barreh et al. |
| 7,269,712 | B2 | 9/2007 | Cho |
| 7,334,086 | B2 | 2/2008 | Haas et al. |
| 7,441,101 | B1 | 10/2008 | Steiss et al. |
| 2002/0062435 | A1 | 5/2002 | Nemirovsky et al. |
| 2002/0083173 | A1 | 6/2002 | Musoll et al. |
| 2002/0087840 | A1 | 7/2002 | Kottapalli et al. |
| 2003/0018686 | A1 | 1/2003 | Kalafatis et al. |
| 2003/0028816 | A1 | 2/2003 | Bacon |
| 2003/0182536 | A1 | 9/2003 | Teruyama |
| 2003/0233394 | A1 * | 12/2003 | Rudd et al. ................. 709/107 |
| 2004/0060052 | A1 | 3/2004 | Brown et al. |
| 2004/0128448 | A1 | 7/2004 | Stark et al. |
| 2004/0139441 | A1 * | 7/2004 | Kaburaki et al. ............ 718/107 |
| 2004/0215944 | A1 | 10/2004 | Burky et al. |
| 2004/0215945 | A1 * | 10/2004 | Burky et al. ................. 712/245 |
| 2004/0215947 | A1 | 10/2004 | Ward et al. |
| 2004/0216105 | A1 | 10/2004 | Burky et al. |
| 2004/0216106 | A1 * | 10/2004 | Kalla et al. ................. 718/100 |
| 2005/0076189 | A1 | 4/2005 | Wittenburg et al. |
| 2005/0138328 | A1 | 6/2005 | Moy et al. |
| 2006/0004989 | A1 | 1/2006 | Golla |
| 2006/0004995 | A1 | 1/2006 | Hetherington et al. |
| 2006/0095732 | A1 | 5/2006 | Tran et al. |
| 2006/0123420 | A1 | 6/2006 | Nishikawa |
| 2006/0168254 | A1 * | 7/2006 | Norton et al. ............... 709/229 |
| 2006/0168393 | A1 | 7/2006 | Christensen et al. |
| 2006/0179274 | A1 | 8/2006 | Jones et al. |
| 2006/0179280 | A1 | 8/2006 | Jensen et al. |
| 2006/0179284 | A1 | 8/2006 | Jensen et al. |
| 2006/0179439 | A1 | 8/2006 | Jones et al. |
| 2006/0212853 | A1 * | 9/2006 | Sutardja ..................... 717/131 |
| 2007/0113053 | A1 | 5/2007 | Jensen et al. |
| 2007/0204137 | A1 | 8/2007 | Tran |
| 2008/0069115 | A1 | 3/2008 | Jensen |
| 2008/0069128 | A1 | 3/2008 | Jensen |
| 2008/0069129 | A1 | 3/2008 | Jensen |
| 2008/0069130 | A1 | 3/2008 | Jensen |

FOREIGN PATENT DOCUMENTS

| | | |
|---|---|---|
| EP | 1351117 | 8/2003 |
| WO | WO02/39269 | 5/2002 |

OTHER PUBLICATIONS

Mano & Kime; Logic and Computer Design Fundamentals; 2001; Prentice Hall; Second Edition Updated; p. 119.

"RTOS Operations Put in Hardware IP", Electronic Engineering Times article, posted Jan. 17, 2005 by Ron Wilson. http://www.eetasia.com/article_content.php3?article_id=8800356670.

"A Survey of Processors With Explicit Multithreading", in ACM Computing Surveys, vol. 35, No. 1, Mar. 2003, pp. 29-63 by Theo Ungerer, et al.

"Interleaving: A Multithreading Technique Targeting Multiprocessors and Workstations", from Proceedings of the 6th International Conference on Architectural Support for Programming Languages and Operating Systems, 1994 by Laudon et al.

"Instruction Recycling on a Multiple-Path Processor", in 5th International Symposium on High Performance Computer Architecture, Jan. 1999 by Wallace et al.

MIPS SOC-it 101 System Controller Family User's Manual, MD0163, Rev. 01.05, May 18, 2004, p. 49-50.

MIPS SOC-it 101 System Controller Family Integrator's Guide, MD0162, Rev. 01.03, May 18, 2004, p. 31-35.

MIPS SOC-it 101 System Controller Family Datasheet, MD0164, Rev. 01.04, May 19, 2004, p. 25-26.

Shin et al. "Dynamic Scheduling Issues in SMT Architectures." Parallel and Distributed Processing Symposium, 2003. Apr. 22, 2003. pp. 77-84. XP010645608. ISBN: 0-76950-1926-1.

Fiske et al. "Thread Prioritization: A Thread Scheduling Mechanism for Multiple-Context Parallel Processors." Future Generations Computer Systems, Elsevier Science Publishers. Amsterdam, NL. vol. 11, No. 6, Oct. 1995. pp. 503-518, XP004002214 ISSN: 0167-739X.

Ilhyun et al. "Understanding Sceduling Replay Schemes." High Performance Computer Architecture. 2004. Department of Electrical and Computer Engineering. University of Wisconsin-Madison. Feb. 14, 2004. XP010778841. ISBN: 0-7695-2053-7.

Sigmund et al. "On Speculation Control in Simultaneous Multithreaded Processors." Journal of Universal Computer Science. vol. 7, No. 9. Sep. 28, 2001. pp. 848-868. XP009069084. ISSN 0948-695X.

Hennessy et al. "Computer Architecture—A Quantative Approach, 3rd edition." 2002. Morgan Kaufmann, USA. XP002388271. ISBN: 1558607242. pp. 181-187.

Sazeides, Yiannakis. "Modeling Value Speculation." High-Performance Computer Architecture, 2002. Feb. 2, 2002. pp. 189-200. XP010588723. ISBN: 07695-1525-8.

"Mercury Computer Systems Introduces The MC432 Serial RapidIO Switch With a Breakthrough Feature Set." connectiviyZONE Products for the week of Dec. 12, 2005. Downloaded on Aug. 18, 2006 from http://www.analogzone.com/iop_1212.htm.

"Tundra Launches Industry's First Serial RapidIO Switch." connectivityZONE Products for the week of Feb. 14, 2005. Downloaded on Aug. 18, 2006 from http://www.analogzone.com/iop_0214.htm.

"Tsi568A." Technical Specifications. Tundra Semiconductor Corporation. 2006. Downloaded on Aug. 18, 2006 from http://www.tundra.com/product_detail.aspx?id=1399.

"MC432 8-port Switch Short Datasheet." Revision 1.2. Mercury Computer Systems, Inc. Feb. 7, 2006.

U.S. Appl. No. 11/086,258, filed Jan. 16, 2007, pp. 1-17 and cover sheet.

Cazorla et al. "DCache Warn: an I-Fetch Policy to Increase SMT Efficiency." 18th International Parallel and Distributed Processing Symposium. Apr. 26, 2004, pp. 74-83. XP002405769 Los Alamitos, CA. USA.

Tullsen et al. "Exploiting Choice: Instruction Fetch and Issue on an Implementable Simultaneous Multithreading Processor." Computer Architecture News, ACM. New York, NY, US. vol. 24, No. 2, May 1, 1996. pp. 191-202, XP000592185. ISSN: 0163-5964 Paragraph 5.2.

Roth et al. "Speculative data-driven multithreading." High-Performance Computer Architecture, 2001. HPCA. The Seventh International Symposium On Monterrey, Mexico Jan. 19-24, 2001, Los Alamitos, CA, USA. IEEE Comput. Soc. US. Jan. 19, 2001. pp. 37-48, XP010531673. ISBN: 0-7695-1019-1.

Wallace et al. "Threaded multiple path execution." Computer Architecture, 1998. Proceedings. The 25th Annual International Symposium on Barcelona. Spain Jun. 27-Jul. 1, 1998. Los Alamitos, CA, USA. IEEE Comput. SOC, US, Jun. 27, 1998, pp. 238-249, XP010291395. ISBN 0-8186-8491-7.

Kreuzinger et al. "Real-time Event-Handling and Scheduling on a Multithreaded Java Microcontroller." Microprocessors and Microsystems, 1PC Business Press LTD. London, GB. vol. 27, No. 1, Feb. 1, 2003, pp. 19-31. XP004404896. ISSN: 0141-9331.

Pouwelse et al. "Energy Priority Scheduling for Variable Voltage Processors." Proceedings of the 2001 International Symposium on Low Power Electronics and Design. ISLPED. Huntington Beach, CA. Aug. 6-7, 2001. pp. 28-33, XP001134578. ISBN: 1-58113-371-5.

MIPS32 Architecture for Programmers, vol. III; The MIPS32 Privileged Resource Architecture. MIPS Technologies, Mar. 12, 2001, pp. 1,2,7,37-39, 49, 53-57. XP002407506.

Lebeck, A.R. et al. "A Large, Fast Instruction Window for Tolerating Cache Misses." Proceedings. 29th Annual International Symposium on Computer Architecture, 2002. Publication Date: 2002. pp. 59-70.

Shen & Lipasti. "Modern Processor Design: Fundamentals of Superscalar Processors." 2004. McGraw-Hill Companies. p. 259.

Kessler, R.E. "The Alpha 21264 Microprocessor. " Compaq Computer Corporation. Mar. - Apr. 1999 IEEE Macro. pp. 24-36.

Office Communication, dated Sep. 14, 2007, for U.S. Appl. No. 11/051,978, filed Feb. 4, 2005, 18 pages.

Office Communication, dated Apr. 10, 2008, for U.S. Appl. No. 11/051,978, filed Feb. 4, 2005, 20 pages.

Office Communication, dated Oct. 28, 2008, for U.S. Appl. No. 11/051,978, filed Feb. 4, 2005, 20 pages.

Office Communication, dated May 11, 2009, for U.S. Appl. No. 11/051,978, filed Feb. 4, 2005, 23 pages.

Office Communication, dated May 28, 2009, for U.S. Appl. No. 11/051,980, filed Feb. 4, 2005, 39 pages.

Office Communication, dated Feb. 8, 2007, for U.S. Appl. No. 11/051,998, filed Feb. 4, 2005, 5 pages.

Office Communication, dated Jun. 1, 2009, for U.S. Appl. No. 11/051,979, filed Feb. 4, 2005, 30 pages.

* cited by examiner

Policy Manager (PM) Operation

Single Instruction/Skid Buffer

INTERFACING EXTERNAL THREAD PRIORITIZING POLICY ENFORCING LOGIC WITH CUSTOMER MODIFIABLE REGISTER TO PROCESSOR INTERNAL SCHEDULER

CROSS REFERENCE TO RELATED APPLICATION(S)

This application is related to and filed concurrently with the following Non-Provisional U.S. Patent Applications, each of which is incorporated by reference in its entirety for all purposes:

| Serial No. (Docket No.) | Filing Date | Title |
| --- | --- | --- |
| 11/051,980 (MIPS.0200-00-US) | Feb. 4, 2005 | LEAKY-BUCKET THREAD SCHEDULER IN A MULTITHREADING MICROPROCESSOR |
| 11/051,979 (MIPS.0201-00-US) | Feb. 4, 2005 | MULTITHREADING MICROPROCESSOR WITH OPTIMIZED THREAD SCHEDULER FOR INCREASING PIPELINE UTILIZATION EFFICIENCY |
| 11/051,998 (MIPS.0201-01-US) | Feb. 4, 2005 | MULTITHREADLNG PROCESSOR INCLUDING THREAD SCHEDULER BASED ON INSTRUCTION STALL LIKELIHOOD PREDICTION |
| 11/051,978 (MIPS.0202-00-US) | Feb. 4, 2005 | INSTRUCTION/SKID BUFFERS IN A MULTITHREADING MICROPROCESSOR |

FIELD OF THE INVENTION

The present invention relates in general to the field of multithreaded processors, and particularly to instruction issue scheduling among multiple threads of execution.

BACKGROUND OF THE INVENTION

Microprocessor designers employ many techniques to increase microprocessor performance. Most microprocessors operate using a clock signal running at a fixed frequency. Each clock cycle the circuits of the microprocessor perform their respective functions. According to Hennessy and Patterson (see Computer Architecture: A Quantitative Approach, 3rd Edition), the true measure of a microprocessor's performance is the time required to execute a program or collection of programs. From this perspective, the performance of a microprocessor is a function of its clock frequency, the average number of clock cycles required to execute an instruction (or alternately stated, the average number of instructions executed per clock cycle), and the number of instructions executed in the program or collection of programs. Semiconductor scientists and engineers are continually making it possible for microprocessors to run at faster clock frequencies, chiefly by reducing transistor size, resulting in faster switching times. The number of instructions executed is largely fixed by the task to be performed by the program, although it is also affected by the instruction set architecture of the microprocessor. Large performance increases have been realized by architectural and organizational notions that improve the instructions per clock cycle, in particular by notions of parallelism.

One notion of parallelism that has improved the instructions per clock cycle, as well as the clock frequency, of microprocessors is pipelining, which overlaps execution of multiple instructions within pipeline stages of the microprocessor. In an ideal situation, each clock cycle one instruction moves down the pipeline to a new stage, which performs a different function on the instructions. Thus, although each individual instruction takes multiple clock cycles to complete, because the multiple cycles of the individual instructions overlap, the average clocks per instruction is reduced. The performance improvements of pipelining may be realized to the extent that the instructions in the program permit it, namely to the extent that an instruction does not depend upon its predecessors in order to execute and can therefore execute in parallel with its predecessors, which is commonly referred to as instruction-level parallelism. Another way in which instruction-level parallelism is exploited by contemporary microprocessors is the issuing of multiple instructions for execution per clock cycle. These microprocessors are commonly referred to as superscalar microprocessors.

What has been discussed above pertains to parallelism at the individual instruction-level. However, the performance improvement that may be achieved through exploitation of instruction-level parallelism is limited. Various constraints imposed by limited instruction-level parallelism and other performance-constraining issues have recently renewed an interest in exploiting parallelism at the level of blocks, or sequences, or streams of instructions, commonly referred to as thread-level parallelism. A thread is simply a sequence, or stream, of program instructions. A multithreaded microprocessor concurrently executes multiple threads according to some scheduling policy that dictates the fetching and issuing of instructions of the various threads, such as interleaved, blocked, or simultaneous multithreading. A multithreaded microprocessor typically allows the multiple threads to share the functional units of the microprocessor (e.g., instruction fetch and decode units, caches, branch prediction units, and load/store, integer, floating-point, SIMD, etc. execution units) in a concurrent fashion. However, multithreaded microprocessors include multiple sets of resources, or contexts, for storing the unique state of each thread, such as multiple program counters and general purpose register sets, to facilitate the ability to quickly switch between threads to fetch and issue instructions.

One example of a performance-constraining issue addressed by multithreading microprocessors is the fact that accesses to memory outside the microprocessor that must be performed due to a cache miss typically have a relatively long latency. It is common for the memory access time of a contemporary microprocessor-based computer system to be between one and two orders of magnitude greater than the cache hit access time. Instructions dependent upon the data missing in the cache are stalled in the pipeline waiting for the data to come from memory. Consequently, some or all of the pipeline stages of a single-threaded microprocessor may be idle performing no useful work for many clock cycles. Multithreaded microprocessors may solve this problem by issuing instructions from other threads during the memory fetch latency, thereby enabling the pipeline stages to make forward progress performing useful work, somewhat analogously to, but at a finer level of granularity than, an operating system performing a task switch on a page fault. Other examples of performance-constraining issues addressed by multithreading microprocessors are pipeline stalls and their accompanying idle cycles due to a branch misprediction and concomitant pipeline flush, or due to a data dependence, or due to a long latency instruction such as a divide instruction, floating-point instruction, or the like. Again, the ability of a multithreaded microprocessor to issue instructions from other threads to pipeline stages that would otherwise be idle may significantly reduce the time required to execute the program or collection of programs comprising the threads.

As may be observed from the foregoing, a processor concurrently executing multiple threads may reduce the time required to execute a program or collection of programs comprising the multiple threads. However, the extent to which a multithreading processor may realize a performance increase over a single-threaded processor may be highly dependent upon the thread scheduling policy of the processor, i.e., how the processor schedules the various threads for issuing their instructions for execution. Furthermore, the appropriate thread scheduling policy may be highly dependent upon the particular application in which the processor is used. For example, multithreading processors may be employed in various applications, including real-time embedded systems like network switches and routers, RAID controllers, printers, scanners, hand-held devices, digital cameras, automobiles, set-top boxes, appliances, etc.; scientific computing; transaction processing; server computing; and general purpose computing. Each of these applications may require a different scheduling policy to optimize performance of the multithreading processor. Consequently, it is highly desirable to enable customers with various applications the ability to customize the thread scheduling policy to meet their particular requirements. A customizable thread scheduler is particularly desirable when attempting to design a multithreading microprocessor core that may be part of a microprocessor and/or system that is customizable to meet the needs of various customer applications. This makes the multithreading core reusable for various designs, which is highly desirable because it avoids having to redesign an entire processor for each application.

However, making the entire thread scheduling circuitry of the microprocessor customizable is problematic since the thread scheduling circuitry is typically closely tied to the internal pipeline operation of the microprocessor, which may have undesirable side effects. For example, it may be difficult for the customer to understand the internal workings of the pipeline, and therefore difficult for the customer to customize the scheduler. Furthermore, timing critical signal paths of the internal pipeline would necessarily be exposed to the customer, which might potentially lower the overall clock speed of the microprocessor if the customer's custom logic is too slow. Finally, the customer may introduce bugs into the scheduler potentially seriously impacting the overall operation and functionality of the microprocessor core. Therefore, what is needed is a multithreading processor with an architecture that enables its thread scheduling policy to be customizable without undesirable side effects, such as those mentioned above.

SUMMARY OF THE INVENTION

The present invention provides a bifurcated scheduler architecture. One portion of the scheduler enforces the thread scheduling policy as needed by the customer's application and is included outside the processor core; therefore, it can be safely modified by the customer without jeopardizing proper operation and reusability of the processor core. The second portion of the scheduler performs the cycle-by-cycle dispatching of instructions based on the thread scheduling policy enforced by the non-core portion and is included in the processor core and; therefore, it cannot be modified by the customer. An interface between the first portion and the core enables the first portion to communicate to the second portion a scheduling priority for each thread, and enables the core to communicate instruction execution information to the first portion so that the first portion can update the priorities to accomplish its thread scheduling policy.

In one aspect, the present invention provides a bifurcated scheduler for dispatching instructions in a multithreading processor configured to concurrently execute a plurality of threads. The scheduler includes first scheduler logic that issues instructions of the plurality of threads to at least one execution unit of the processor. The scheduler also includes second scheduler logic that enforces a scheduling policy of the plurality of threads. The second scheduler logic comprises customer-modifiable logic. The scheduler also includes an interface, coupling the second scheduler logic to the first scheduler logic and to the at least one execution unit. The interface includes first signal lines for the first scheduler logic to receive from the second scheduler logic a priority for each of the plurality of threads. The first scheduler logic issues the instructions to the at least one execution unit based on the priorities. The interface also includes second signal lines for the second scheduler logic to receive instruction execution information for each of the plurality of threads. The second scheduler logic updates the priorities based on the instruction execution information. The execution information indicates when the at least one execution unit executes an instruction for each of the plurality of threads.

In another aspect, the present invention provides a multithreading processor. The processor includes thread scheduling policy logic that enforces a policy for scheduling instruction dispatch of a plurality of threads concurrently executed by the processor. The thread scheduling policy logic comprises customer-modifiable logic. The processor also includes a processor core, coupled to the thread scheduling policy logic. The processor core includes at least one execution pipeline that executes instructions. The processor core also includes an instruction dispatcher, coupled to dispatch instructions of the plurality of threads to the execution pipeline based on the policy received from the thread scheduling policy logic. The processor also includes an interface for coupling the thread scheduling policy logic and the processor core. The interface includes priority signal lines, for the thread scheduling policy logic to communicate to the instruction dispatcher a dispatch priority for each of the plurality of threads to enforce the policy. The interface also includes execution signal lines, for the at least one execution pipeline to communicate to the thread scheduling policy logic for each of the plurality of threads an indication of whether the at least one execution pipeline executed an instruction for the thread.

In another aspect, the present invention provides a thread scheduling policy manager for enforcing a thread scheduling policy of a multithreading processor that concurrently executes a plurality of threads. The policy manager includes inputs for receiving, each processor clock cycle, an indication of whether an instruction was executed for each of the plurality of threads. The policy manager also includes outputs for transmitting, each processor clock cycle, an instruction dispatch priority for each of the plurality of threads. The policy manager also includes logic, coupled to the inputs, that generates the outputs based on the inputs to enforce the thread scheduling policy. The thread scheduling policy manager comprises customer-modifiable logic.

In another aspect, the present invention provides a multithreading processor core configured to concurrently execute a plurality of threads. Each of the plurality of threads comprises a stream of instructions. The processor core includes an interface for coupling the processor core to thread scheduling policy logic external to the processor core. The interface includes first signal lines for the thread scheduling policy logic to communicate to the processor core a priority of each of the plurality of threads. The thread scheduling policy logic comprises customer-modifiable logic. The interface also includes second signal lines for the thread scheduling policy logic to receive from the processor core information for each of the plurality of threads indicating instructions of the threads were executed, for use by the thread scheduling policy logic to update the priorities. The processor core also includes a scheduler, coupled to receive the first signal lines and to select at least one instruction from at least one of the plurality of threads to issue for execution, based on the priorities received on the first signal lines.

In another aspect, the present invention provides a method for scheduling a plurality of concurrently executing threads in a multithreading processor. The method includes execution logic signaling to thread scheduling policy logic an indication whether the execution logic executed an instruction for each of the plurality of threads during a first clock cycle. The thread scheduling policy logic comprises customer-modifiable logic. The method also includes the thread scheduling policy logic signaling to instruction dispatch logic a thread scheduling priority for each of the plurality of threads, during a second clock cycle in response to the execution logic signaling to thread scheduling policy logic the indication. The method also includes the instruction dispatch logic dispatching at least one instruction from the plurality of threads for execution, during a third clock cycle, in response to the thread scheduling policy logic signaling the priorities to the instruction dispatch logic.

In another aspect, the present invention provides a computer program product for use with a computing device. The computer program product includes a computer usable medium, having computer readable program code embodied in the medium, for causing a bifurcated scheduler for dispatching instructions in a multithreading processor configured to concurrently execute a plurality of threads. The computer readable program code includes first program code for providing first scheduler logic that issues instructions of the plurality of threads to at least one execution unit of the processor. The computer readable program code also includes second program code for providing second scheduler logic that enforces a scheduling policy of the plurality of threads. The second scheduler logic comprises customer-modifiable logic. The computer readable program code also includes third program code for providing an interface, coupling the second scheduler logic to the first scheduler logic and to the at least one execution unit. The interface includes first signal lines for the first scheduler logic to receive from the second scheduler logic a priority for each of the plurality of threads. The first scheduler logic issues the instructions to the at least one execution unit based on the priorities. The interface also includes second signal lines for the second scheduler logic to receive instruction execution information for each of the plurality of threads. The second scheduler logic updates the priorities based on the instruction execution information. The execution information indicates when the at least one execution unit executes an instruction for each of the plurality of threads.

In another aspect, the present invention provides a computer program product for use with a computing device. The computer program product includes a computer usable medium, having computer readable program code embodied in the medium, for causing a multithreading processor. The computer readable program code includes first program code for providing thread scheduling policy logic that enforces a policy for scheduling instruction dispatch of a plurality of threads concurrently executed by the processor. The thread scheduling policy logic comprises customer-modifiable logic. The computer readable program code also includes second program code for providing a processor core, coupled to the thread scheduling policy logic. The processor core includes at least one execution pipeline that executes instructions. The processor core also includes an instruction dispatcher, coupled to dispatch instructions of the plurality of threads to the execution pipeline based on the policy received from the thread scheduling policy logic. The computer readable program code also includes third program code for providing also includes an interface for coupling the thread scheduling policy logic and the processor core. The interface includes priority signal lines, for the thread scheduling policy logic to communicate to the instruction dispatcher a dispatch priority for each of the plurality of threads to enforce the policy. The interface also includes execution signal lines, for the at least one execution pipeline to communicate to the thread scheduling policy logic for each of the plurality of threads an indication of whether the at least one execution pipeline executed an instruction for the thread.

In another aspect, the present invention provides a computer program product for use with a computing device. The computer program product includes a computer usable medium, having computer readable program code embodied in the medium, for causing a thread scheduling policy manager for enforcing a thread scheduling policy of a multithreading processor that concurrently executes a plurality of threads. The computer readable program code includes first program code for providing inputs for receiving, each processor clock cycle, an indication of whether an instruction was executed for each of the plurality of threads. The computer readable program code also includes second program code for providing outputs for transmitting, each processor clock cycle, an instruction dispatch priority for each of the plurality of threads. The computer readable program code also includes third program code for providing logic, coupled to the inputs, that generates the outputs based on the inputs to enforce the thread scheduling policy. The thread scheduling policy manager comprises customer-modifiable logic.

In another aspect, the present invention provides a computer program product for use with a computing device. The computer program product includes a computer usable medium, having computer readable program code embodied in the medium, for causing a multithreading processor core configured to concurrently execute a plurality of threads, each of the plurality of threads comprising a stream of instructions. The computer readable program code includes first program code for providing an interface for coupling the processor core to thread scheduling policy logic external to the processor core. The interface includes first signal lines for the thread scheduling policy logic to communicate to the processor core a priority of each of the plurality of threads. The thread scheduling policy logic comprises customer-modifiable logic. The interface also includes second signal lines for the thread scheduling policy logic to receive from the processor core information for each of the plurality of threads indicating instructions of the threads were executed, for use by the thread scheduling policy logic to update the priorities. The computer readable program code also includes second program code for providing a scheduler, coupled to receive the first signal lines and to select at least one instruction from at least one of the plurality of threads to issue for execution, based on the priorities received on the first signal lines.

In another aspect, the present invention provides an interface between a processor core and thread scheduling policy logic for enabling the policy logic to enforce a policy for scheduling the concurrent dispatch of a plurality of threads by the processor core. The interface includes priority signal lines for the thread scheduling policy logic to communicate a dispatch priority for each of the plurality of threads to an instruction dispatcher of the processor core. The thread scheduling policy logic comprises customer-modifiable logic. The interface also includes feedback signal lines for an execution pipeline of the processor core to communicate to the thread scheduling policy logic for each of the plurality of threads an indication of whether the execution pipeline executed an instruction for the thread.

An advantage of the bifurcated scheduler described herein is that it enables a processor core to be designed that is reusable by multiple customers and to operate correctly and at operating clock frequencies as designed, while still allowing customers to enforce their own thread scheduling policy needed by their particular application. Another advantage of the bifurcated scheduler described herein is that it enables customers to determine the amount of the thread scheduling policy performed by hardware versus software. That is, some customers may want to implement a large portion, or perhaps all, of the thread scheduling policy in hardware; whereas, other customers may want to implement a minimal amount of the thread scheduling policy in hardware and have software perform the bulk of the thread scheduling policy.

DETAILED DESCRIPTION

Figure 1:
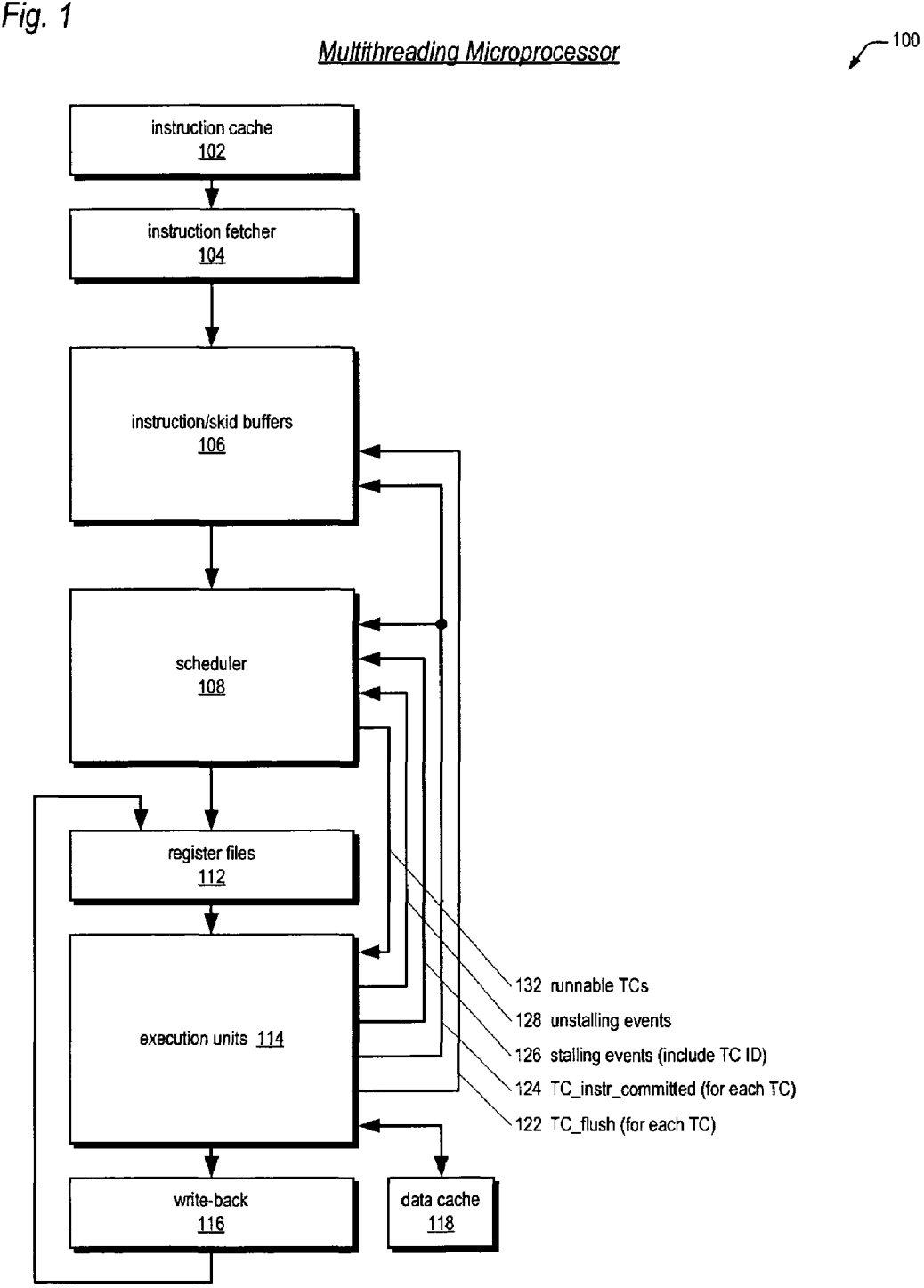
FIG. 1 is a block diagram illustrating a pipelined multi-threading microprocessor according to the present invention.

Referring now to FIG. 1, a block diagram illustrating a pipelined multithreading microprocessor 100 according to the present invention is shown. The microprocessor 100 is configured to concurrently execute a plurality of threads. A thread—also referred to herein as a thread of execution, or instruction stream—comprises a sequence, or stream, of program instructions. The threads may be from different programs executing on the microprocessor 100, or may be instruction streams from different parts of the same program executing on the microprocessor 100, or a combination thereof.

Each thread has an associated thread context (TC). A thread context comprises a collection of storage elements, such as registers or latches, and/or bits in the storage elements of the microprocessor 100 that describe the state of execution of a thread. That is, the thread context describes the state of its respective thread, which is unique to the thread, rather than state shared with other threads of execution executing concurrently on the microprocessor 100. By storing the state of each thread in the thread contexts, the microprocessor 100 is configured to quickly switch between threads to fetch and issue instructions. In one embodiment, each thread context includes a program counter (PC), a general purpose register set, and thread control registers, which are included in register files 112 of the microprocessor 100.

The microprocessor 100 concurrently executes the threads according to a scheduling policy that dictates the fetching and issuing of instructions of the various threads. Various embodiments for scheduling the dispatching of instructions from the multiple threads are described herein. The terms instruction "issue" and "dispatch" are used interchangeably herein. The multithreaded microprocessor 100 allows the multiple threads to share the functional units of the microprocessor 100 (e.g., instruction fetch and decode units, caches, branch prediction units, and execution units, such as load/store, integer, floating-point, SIMD, and other execution units) in a concurrent fashion.

The microprocessor 100 includes an instruction cache 102 for caching program instructions—in particular, the instructions of the various threads—fetched from a system memory of a system including the microprocessor 100. The microprocessor 100 also includes an instruction fetcher 104, or instruction fetch pipeline 104, coupled to concurrently fetch instructions of the multiple threads from the instruction cache 102 and/or system memory into instruction/skid buffers 106, coupled to the instruction fetcher 104. In one embodiment, the instruction fetch pipeline 104 includes a four stage pipeline. The instruction/skid buffers 106 provide instructions to an instruction scheduler 108, or thread scheduler 108. In one embodiment, each thread has its own instruction/skid buffer 106. Each clock cycle, the scheduler 108 selects an instruction from one of the threads and issues the instruction for execution by execution stages of the microprocessor 100 pipeline. The register files 112 are coupled to the scheduler 108 and provide instruction operands to execution units 114 that execute the instructions. The microprocessor 100 also includes a data cache 118 coupled to the execution units 114. The execution units 114 may include, but are not limited to, integer execution units, floating-point execution units, SIMD execution units, load/store units, and branch execution units. In one embodiment, the integer execution unit pipeline includes four stages: a register file (RF) access stage in which the register file 112 is accessed, an address generation (AG) stage, an execute (EX) stage, and a memory second (MS) stage. In the EX stage, simple ALU operations are performed (such as adds, subtracts, shifts, etc.). Additionally, the data cache 118 is a two-cycle cache that is accessed during a first clock cycle in the EX stage and is accessed during a second clock cycle in the MS stage. Each thread context includes its own register file 112, and each register file includes its own program counter, general purpose register set, and thread control registers. The instruction fetcher 104 fetches instructions of the threads based on the program counter value of each thread context. It is noted that some of the execution units 114 may be pipelined, and some extensively. The microprocessor 100 pipeline also includes a write-back stage 116 that writes instruction results back into the register files 112. In one embodiment, the microprocessor 100 pipeline also includes an exception resolution stage coupled between the execution units 114 and the write-back stage 116.

The execution units 114 generate a TC_instr_committed signal 124 associated with each thread context to indicate that an instruction of the specified thread has been committed for execution. An instruction has been committed for execution if the instruction is guaranteed not to be flushed by the microprocessor 100 pipeline, but instead to eventually complete execution, which generates a result and updates the architectural state of the microprocessor 100. In one embodiment, multiple instructions may be committed per clock cycle, and the TC_instr_committed signals 124 indicate the number of instructions committed for the thread context that clock cycle. The TC_instr_committed signals 124 are provided to the scheduler 108. In response to the TC_instr_committed signal 124, the scheduler 108 updates a virtual water level indicator for the thread that is used by the thread scheduling policy of the scheduler 108 to accomplish required quality-of-service, as described below with respect to FIGS. 9 and 10.

The TC_instr_committed signals 124 are also provided to the respective instruction/skid buffers 106. In response to the TC_instr_committed signal 124, the instruction/skid buffer 106 updates a pointer to effectively remove the instruction from the buffer 106. In a conventional microprocessor, instructions are removed from a conventional instruction buffer and issued for execution. However, advantageously, the instruction/skid buffers 106 described herein continue to store instructions after they have been issued for execution. The instructions are not removed from the instruction/skid buffers 106 until the execution units 114 indicate that an instruction has been committed for execution via the respective TC_instr_committed signal 124, as described in detail below with respect to FIGS. 3 and 4.

The scheduler 108 provides to the execution units 114 a runnable TCs signal 132. The runnable TCs signal 132 specifies which of the thread contexts are runnable, i.e., which thread contexts the scheduler 108 may currently issue instructions from. In one embodiment, a thread context is runnable if the thread context is active and is not blocked by other conditions (such as being Halted, Waiting, Suspended, or Yielded), as described below with respect to FIG. 7. In particular, the execution units 114 use the runnable TCs signal 132 to determine whether a stalled thread context is the only runnable thread context for deciding whether or not to flush the instructions of the stalled thread context, as described in detail below with respect to FIG. 5.

The execution units 114 provide to the scheduler 108 a stalling events signal 126. The stalling events signal 126 indicates that an instruction has stalled, or would have stalled, in an execution unit 114 for the reason specified by the particular stalling event signal 126. In addition, the stalling events signal 126 includes an identifier identifying the thread context of the stalled instruction. The execution units 114 also provide to the scheduler 108 an unstalling events signal 128. In response to the stalling events signal 126, the scheduler 108 stops issuing instructions for the stalled thread context until a relevant unstalling event 128 is signaled, as described in more detail below with respect to FIG. 5.

Examples of events that would cause an execution unit 114 to stall in response to an instruction include, but are not limited to, the following. First, the instruction may be dependent upon unavailable data, such as data from a load instruction that misses in the data cache 118. For example, an add instruction may specify an operand which is unavailable because a preceding load instruction that missed in the data cache 118 and the operand has not yet been fetched from system memory. Second, the instruction may be dependent upon data from a long-running instruction, such as a divide or other long arithmetic instruction, or an instruction that moves a value from a coprocessor register, for example. Third, the instruction may introduce a conflict for a limited hardware resource. For example, in one embodiment the microprocessor 100 includes a single divider circuit. If a divide instruction is already being executed by the divider, then a second divide instruction must stall waiting for the first divide instruction to finish. For another example, in one embodiment the microprocessor 100 instruction set includes a group of instructions for performing low-level management operations of the instruction cache 102. If an instruction cache management instruction is already being executed, then a second instruction cache management instruction must stall waiting for the first to finish. For another example, in one embodiment, the microprocessor 100 includes a load queue that includes a relatively small number of slots for storing in-progress data cache 118 refills. When a load instruction misses in the data cache 118, a load queue entry is allocated and a processor bus transaction is initiated to obtain the missing data from system memory. When the data is returned on the bus, it is stored into the load queue and is subsequently written into the data cache 118. When the bus transaction is complete and all the data is written to the data cache 118, the load queue entry is freed. However, when the load queue is full, a load miss causes a pipeline stall. Fourth, the instruction may follow an EHB instruction. In one embodiment, the microprocessor 100 instruction set includes an EHB (Execution Hazard Barrier) instruction that is used by software to stop instruction execution until all execution hazards have been cleared. Typically, instructions following an EHB instruction will stall in the pipeline until the EHB instruction is retired. Fifth, the instruction may follow a load or store instruction addressed to inter-thread communication (ITC) space in its same thread context. In one embodiment, the microprocessor 100 supports loads and stores to an ITC space comprising synchronized storage, which can block for arbitrarily long times causing instructions in the same thread context following the ITC load or store to stall.

Conversely, examples of unstalling events 128 include, but are not limited to, the following: load data that missed in the data cache 118 is returned; a limited hardware resource is freed up, such as a divider circuit, the instruction cache 102, or a load queue slot; an EHB instruction, long-running instruction, or load/store instruction to inter-thread communication (ITC) space completes.

The execution units 114 also generate a TC_flush signal 122 associated with each thread context to indicate that the instructions of the specified thread in the execution portion of the pipeline (i.e., portion of the pipeline below the scheduler 108) have been flushed, or nullified. In one embodiment, flushing or nullifying an instruction comprises clearing a valid bit associated with the instruction in the pipeline, which prevents the pipeline from updating the architectural state of the microprocessor 100 in response to results of the instruction. One reason an execution unit 114 may generate a TC_flush signal 122 is when an instruction of a thread would stall in the execution unit 114, as described above. Nullifying or flushing the instruction removes the reason for the instruction to be stalled, since the results generated for the instruction will be disregarded and therefore need not be correct. Advantageously, by flushing the stalling instruction, instructions of other threads may continue to execute and utilize the execution bandwidth of the execution pipeline, thereby potentially increasing the overall performance of the microprocessor 100, as described in more detail below. In one embodiment, only instructions of the stalling thread are flushed, which may advantageously reduce the number of pipeline bubbles introduced by the flush, and in some cases may cause only one bubble associated with the stalling instruction, depending upon the composition of instructions from the various threads present in the execution unit 114 pipeline. In one embodiment, the TC_flush signal 122 signal indicates that all uncommitted instructions of the thread context have been flushed. In another embodiment, the execution unit 114 may flush fewer than the number of uncommitted instructions present in the execution unit 114, namely the stalling instruction and any newer instructions of the stalling thread context, but not flush uncommitted instructions of the thread context that are older than the stalling instruction. In this embodiment, the TC_flush signal 122 signal also indicates a number of instructions that were flushed by the execution unit 114.

The TC_flush signals 122 are provided by the execution units 114 to their respective instruction/skid buffers 106. The instruction/skid buffer 106 uses the TC_flush signal 122 to roll back the state of the instructions in the buffer 106 as described below with respect to FIGS. 3 and 4. Because the instruction/skid buffers 106 continue to store instructions until they have been committed not to be flushed, any instructions that are flushed may be subsequently re-issued from the instruction/skid buffers 106 without having to be re-fetched from the instruction cache 102. This has the advantage of potentially reducing the penalty associated with flushing stalled instructions from the execution pipeline to enable instructions from other threads to execute. Reducing the likelihood of having to re-fetch instructions is becoming increasingly important since instruction fetch times appear to be increasing. This is because, among other things, it is becoming more common for instruction caches to require more clock cycles to access than in older microprocessor designs, largely due to the decrease in processor clock periods. Thus, the penalty associated with an instruction re-fetch may be one, two, or more clock cycles more than in earlier designs.

Figure 2:
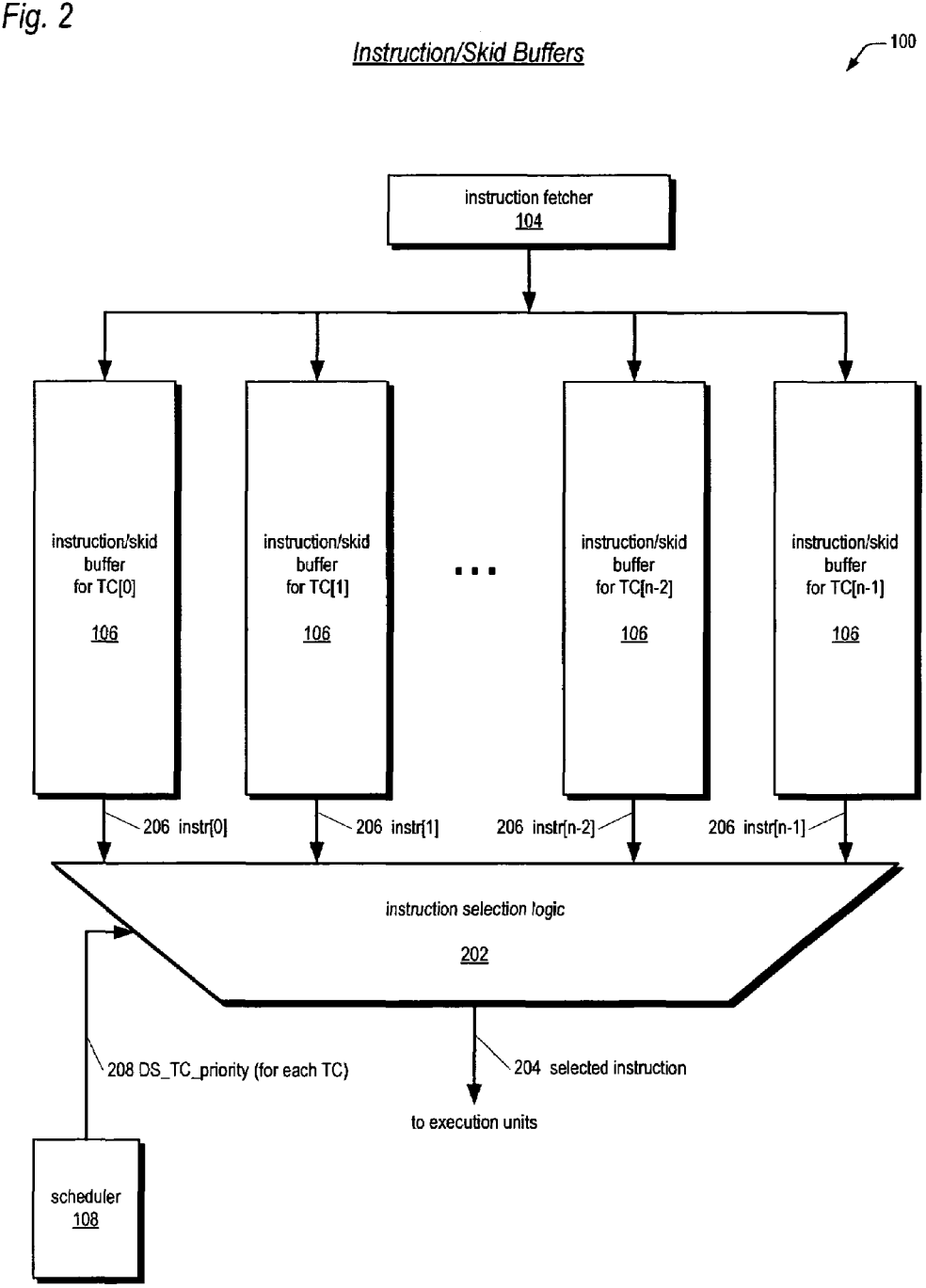
FIG. 2 is a block diagram illustrating portions of the microprocessor of FIG. 1, and in particular, instruction/skid buffers according to one embodiment of the present invention.

Referring now to FIG. 2, a block diagram illustrating portions of the microprocessor 100 of FIG. 1, and in particular, instruction/skid buffers 106 according to one embodiment of the present invention is shown. FIG. 2 illustrates a plurality of instruction/skid buffers 106 for a plurality of respective thread contexts into which the instruction fetcher 104 of FIG. 1 fetches instructions. The structure and operation of the instruction/skid buffers 106 according to one embodiment are shown in more detail below with respect to FIGS. 3 and 4. Each instruction/skid buffer 106 provides an instruction 206 to instruction selection logic 202. Each clock cycle, the instruction selection logic 202 selects one of the instructions 206 as selected instruction 204 for provision to the execution units 114 to be executed. The instruction selection logic 202 selects the selected instruction 204 in response to a DS_TC_priority signal 208 provided by the scheduler 108 of FIG. 1 for each thread context. Operation of the DS_TC_priority signal 208 is described in more detail below with respect to FIGS. 7 and 8.

Although an embodiment is described in which the microprocessor 100 is a scalar processor, i.e., only issues for execution one instruction per clock cycle, it should be understood that the instruction selection logic 202 may be configured to operate within a superscalar processor that issues multiple instructions per clock cycle. Furthermore, the instruction selection logic 202 may be configured to select instructions for issue from multiple and different thread contexts per clock cycle, commonly referred to as simultaneous multithreading.

Figure 3:
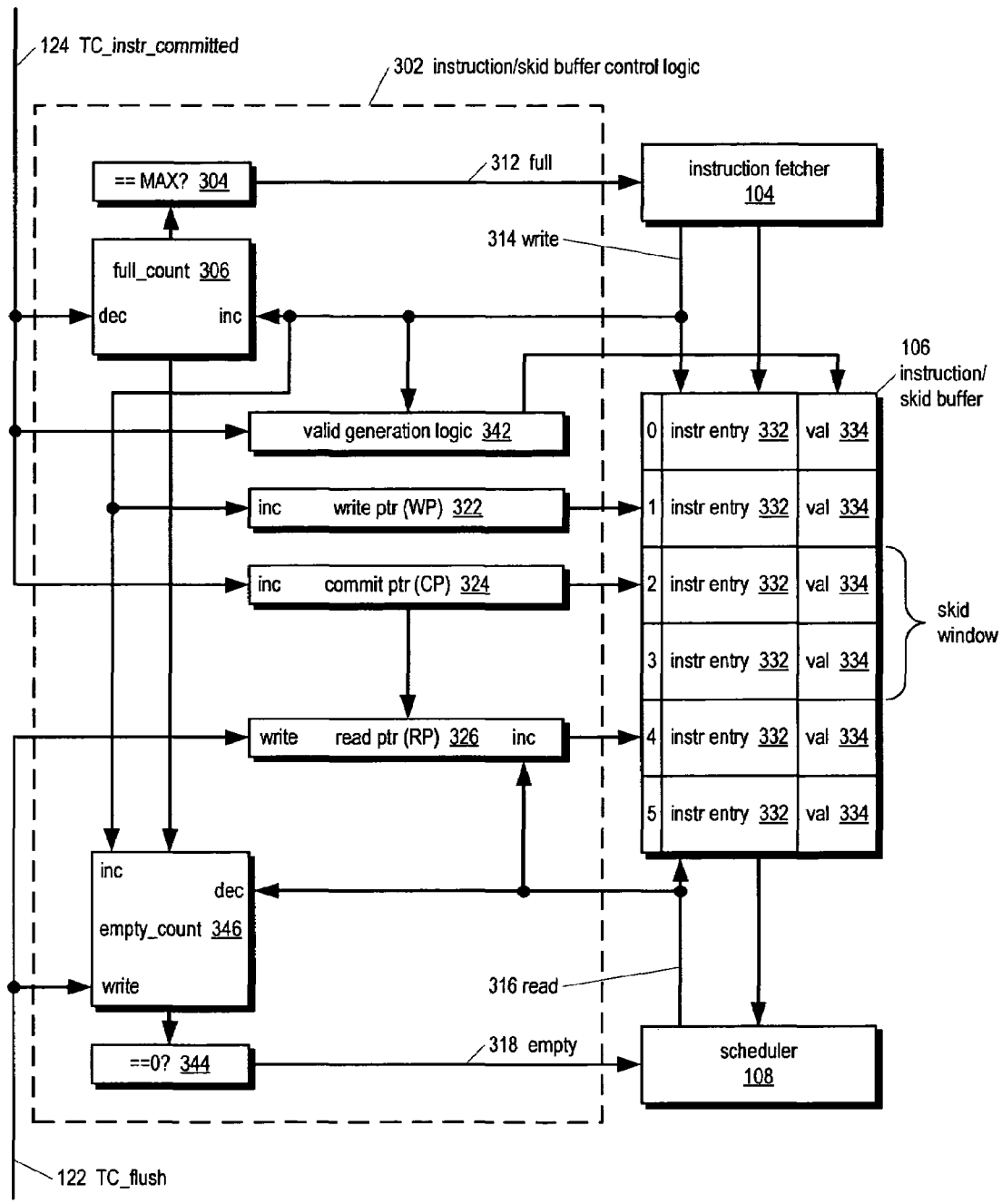
FIG. 3 is a block diagram illustrating an instruction/skid buffer exemplifying one of the instruction/skid buffers of FIG. 2 and associated control logic according to the present invention.

Referring now to FIG. 3, a block diagram illustrating an instruction/skid buffer 106 exemplifying one of the instruction/skid buffers 106 of FIG. 2 and associated control logic 302 according to the present invention is shown. Each of the instruction/skid buffers 106 of FIG. 2 is similar to the instruction/skid buffer 106 shown in FIG. 3. That is, although only one instruction/skid buffer 106 and associated control logic 302 is shown in FIG. 3, in one embodiment one instruction/skid buffer 106 and associated control logic 302 exists for each thread context. The instruction/skid buffer 106 includes a plurality of entries 332, each for storing an instruction, and an associated valid bit 334, for indicating whether the associated instruction is valid. FIG. 3 illustrates an instruction/skid buffer 106 with six entries, denoted 0 through 5. In the embodiment of FIG. 3, the instruction/skid buffer 106 is configured as a circular queue of entries.

The instruction fetcher 104 of FIG. 1 generates a write signal 314 to the instruction/skid buffer 106 each time it writes an instruction into the instruction/skid buffer 106. The write signal 314 is also provided to the control logic 302. The control logic 302 generates a full signal 312 to the instruction fetcher 104 to indicate that the instruction/skid buffer 106 is full so that the instruction fetcher 104 will not write more instructions into the instruction/skid buffer 106 until the instruction/skid buffer 106 is no longer full.

The scheduler 108 of FIG. 1 generates a read signal 316 each time it reads an instruction from the instruction/skid buffer 106. The read signal 316 is also provided to the control logic 302. The control logic 302 generates an empty signal 318 to the scheduler 108 to indicate that the instruction/skid buffer 106 is empty so that the scheduler 108 will not attempt to read another instruction from the instruction/skid buffer 106 until the instruction/skid buffer 106 is no longer empty.

The control logic 302 includes valid generation logic 342 that updates the valid bits 334 of the instruction/skid buffer 106. The valid generation logic 342 receives the TC_instr_committed signal 124 of FIG. 1 for the respective thread context. Each time the execution units 114 generate the TC_instr_committed signal 124, the valid generation logic 342 invalidates the oldest valid instruction in the instruction/skid buffer 106. The valid generation logic 342 also receives the write signal 314 from the instruction fetcher 104. Each time the instruction fetcher 104 generates the write signal 314 the valid generation logic 342 marks the entry valid in the instruction/skid buffer 106 into which the instruction was written.

The control logic 302 also includes a full_count counter 306 that stores the number of valid instructions present in the instruction/skid buffer 106. The full_count counter 306 is incremented by the write signal 314 from the instruction fetcher 104 and decremented by the TC_instr_committed signal 124. The control logic 302 also includes a comparator 304 that compares the full_count 306 to the maximum number of instructions that may be stored in the instruction/skid buffer 106 (i.e., the total number of entries 332 in the instruction/skid buffer 106) to generate a true value on the full signal 312 when the full_count 306 equals the maximum number of instruction/skid buffer 106 instructions.

The control logic 302 also includes an empty_count counter 346 that stores the number of valid instructions present in the instruction/skid buffer 106 that currently are eligible for issuing. The empty_count 346 may be less than the full_count 306 at certain times since some valid instructions may be present in the instruction/skid buffer 106 which have already been issued to the execution pipeline (but have not yet been committed) and therefore are not currently eligible for issuing. The empty_count counter 346 is incremented by the write signal 314 from the instruction fetcher 104 and decremented by the read signal 316 from the scheduler 108. The control logic 302 also includes a comparator 344 that compares the empty_count 346 to zero to generate a true value on the empty signal 318 when the empty_count 346 equals zero. Additionally, the empty_count counter 346 is written with the value of the full_count counter 306 in response to a true value on the TC_flush signal 122 of FIG. 1.

The control logic 302 also includes a write pointer 322, commit pointer 324, and read pointer 326, each of which is a counter initialized to entry 0 of the instruction/skid buffer 106. Each of the counters wraps back to zero when incremented beyond its maximum value, which is one less than the number of entries in the instruction/skid buffer 106. The write pointer 322 specifies the next entry in the instruction/skid buffer 106 into which the instruction fetcher 104 writes an instruction and is incremented by the write signal 314 after the instruction is written. The commit pointer 324 specifies the next instruction in the instruction/skid buffer 106 to be committed and is incremented by the TC_instr_committed signal 124. The read pointer 326 specifies the next entry in the instruction/skid buffer 106 from which the scheduler 108 reads an instruction and is incremented by the read signal 316 after the instruction is read. Additionally, the read pointer 326 is written with the value of the commit pointer 324 in response to a true value on the TC_flush signal 122. As shown in FIG. 3, the skid window includes the entries of the instruction/skid buffer 106 starting at the commit pointer 324 up to, but not including, the entry pointed to by the read pointer 326. The skid window includes the valid instructions that have already been issued for execution but have not yet been committed.

Figure 4:
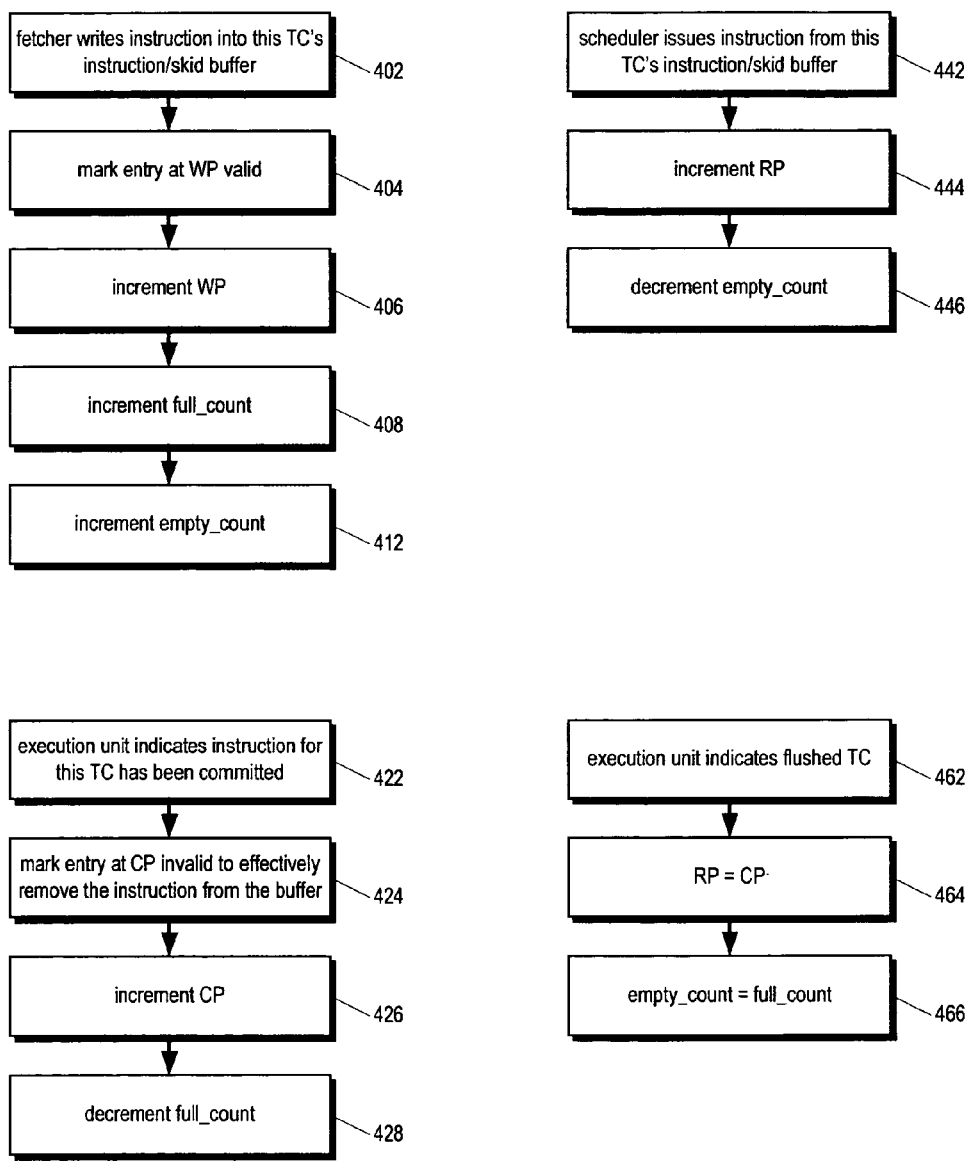
FIG. 4 is four flowcharts illustrating operation of the instruction/skid buffer of FIG. 3 according to the present invention.

Referring now to FIG. 4, four flowcharts illustrating operation of the instruction/skid buffer 106 of FIG. 3 according to the present invention are shown. Each of the flowcharts illustrates actions performed by the instruction/skid buffer 106 in response to a different event. Flow of the first flowchart begins at block 402.

At block 402, the instruction fetcher 104 of FIG. 1 asserts the write signal 314 of FIG. 3 for the respective instruction/skid buffer 106 and writes an instruction into the instruction/skid buffer 106. Flow proceeds to block 404.

At block 404, the valid generation logic 342 marks the entry specified by the write pointer 322 as valid in response to the write signal 314. Flow proceeds to block 406.

At block 406, the write pointer 322 of FIG. 3 is incremented in response to the write signal 314. Flow proceeds to block 408.

At block 408, the full_count counter 306 of FIG. 3 is incremented in response to the write signal 314. Flow proceeds to block 412.

At block 412, the empty_count counter 346 of FIG. 3 is incremented in response to the write signal 314. Flow of the first flowchart ends at block 412.

Flow of the second flowchart begins at block 422.

At block 422, an execution unit 114 of FIG. 1 asserts the TC_instr_committed signal 124 of FIG. 1 for the thread context associated with the instruction/skid buffer 106. Flow proceeds to block 424.

At block 424, the valid generation logic 342 marks the entry specified by the commit pointer 324 of FIG. 3 as invalid in response to the TC_instr_committed signal 124, thereby effectively removing the instruction from the buffer. Flow proceeds to block 426.

At block 426, the commit pointer 324 is incremented in response to the TC_instr_committed signal 124. Flow proceeds to block 428.

At block 428, the full_count counter 306 is decremented in response to the TC_instr_committed signal 124. Flow of the second flowchart ends at block 428.

In one embodiment, rather than receiving the TC_instr_committed signal 124, the control logic 302 receives another signal from the execution unit 114 that simply indicates an instruction should be removed from the instruction/skid buffer 106, even though the instruction may not yet be guaranteed not to require re-dispatching. In one embodiment, the signal indicates an instruction has reached a predetermined re-dispatch pipeline stage. If the control logic 302 detects that the instruction has reached the predetermined stage, the control logic 302 removes the instruction from the instruction/skid buffer 106. In another embodiment, the signal indicates each clock cycle whether an instruction has been running, i.e., has not been stalled, but has instead proceeded to the next pipeline stage. If the control logic 302 detects that the instruction has been running a predetermined number of clock cycles, the control logic 302 removes the instruction from the instruction/skid buffer 106. In these embodiments, the likelihood that an instruction will require re-dispatching once it reaches a particular stage in the execution pipeline 114 is low enough to justify removing it from the instruction/skid buffer 106 to make room for another instruction to be written into the instruction/skid buffer 106, even though the instruction is not yet guaranteed not to require re-dispatching. In this embodiment, if the execution unit 114 subsequently indicates that the instruction was flushed before completing execution, then the entire instruction/skid buffer 106 for the thread context must be flushed, along with the entire instruction fetch pipeline 104, to guarantee that the thread instructions are issued in proper order.

Flow of the third flowchart begins at block 442.

At block 442, the scheduler 108 of FIG. 1 asserts the read signal 316 of FIG. 3 for the respective instruction/skid buffer 106 and reads an instruction from the instruction/skid buffer 106 to issue to the execution pipeline. Flow proceeds to block 444.

At block 444, the read pointer 326 of FIG. 3 is incremented in response to the read signal 316. Flow proceeds to block 446.

At block 446, the empty_count counter 346 is decremented in response to the read signal 316. Flow of the third flowchart ends at block 446.

Flow of the fourth flowchart begins at block 462.

At block 462, asserts the TC_flush signal 122 for the thread context associated with the instruction/skid buffer 106. Flow proceeds to block 464.

At block 464, the read pointer 326 is loaded with the commit pointer 324 in response to the TC_flush signal 122. Flow proceeds to block 466.

At block 466, the empty_count counter 346 is loaded with the full_count 306 in response to the TC_flush signal 122. Flow of the fourth flowchart ends at block 466.

As discussed above, in one embodiment, the TC_flush signal 122 signal indicates that the execution unit 114 has flushed all uncommitted instructions of the thread context. The fourth flowchart of FIG. 4 describes operation of the instruction/skid buffer 106 for this embodiment. However, in another embodiment, the execution unit 114 may flush fewer than the number of uncommitted instructions present in the execution unit 114, namely the stalling instruction and any newer instructions of the stalling thread context, but not flush uncommitted instructions of the thread context that are older than the stalling instruction. In this embodiment, the TC_flush signal 122 signal also indicates a number of instructions that were flushed by the execution unit 114. In this embodiment, at block 464 the number of instructions flushed is subtracted from the read pointer 326, rather than updating the read pointer 326 with the commit pointer 324. Additionally, at block 466, the number of instructions flushed is added to the empty_count 346, rather than updating the empty_count 346 with the full_count counter 306.

Figure 5:
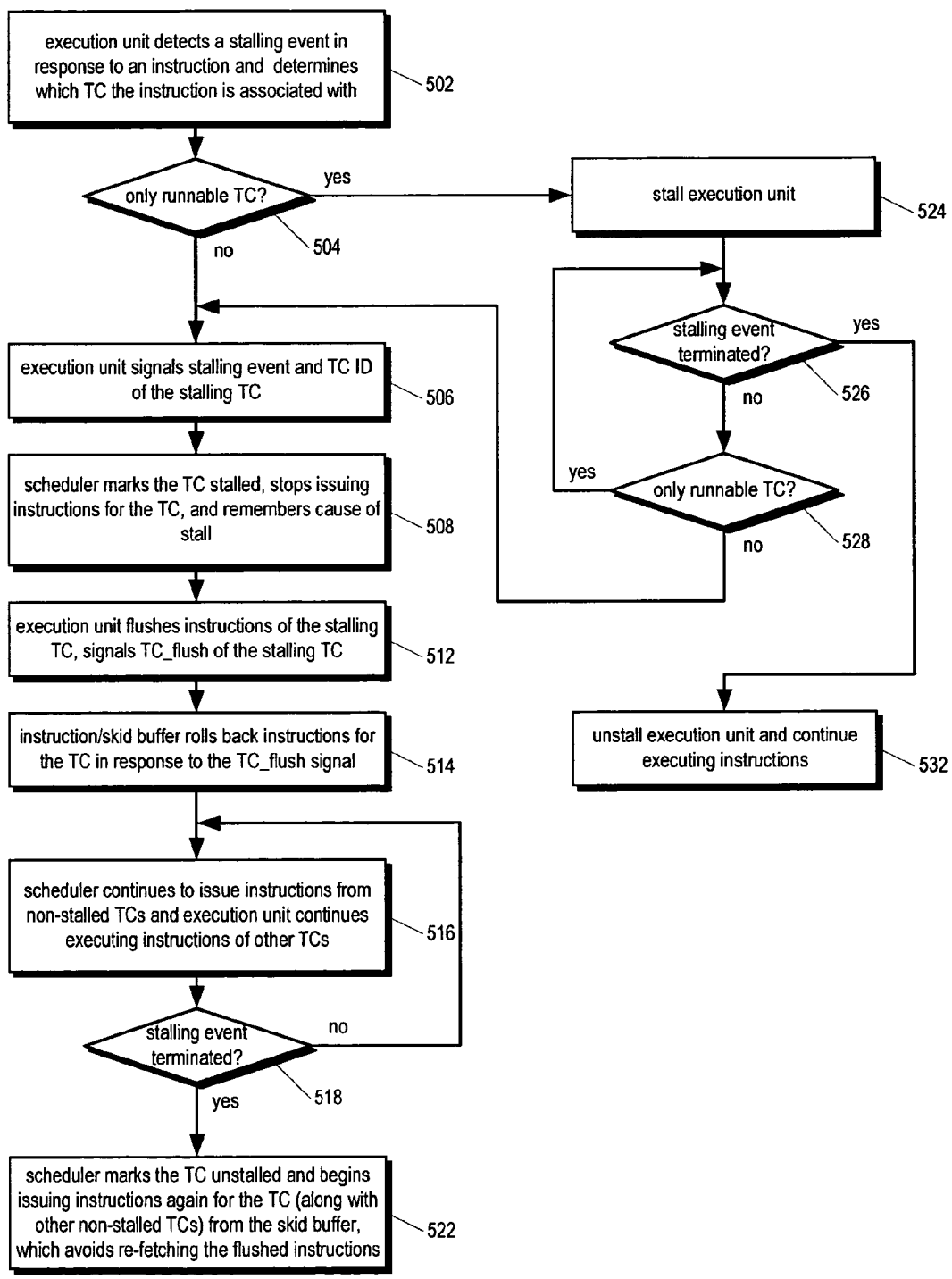
FIG. 5 is a flowchart illustrating operation of the microprocessor of FIG. 1 to flush a stalled thread context to improve execution bandwidth utilization according to the present invention.

Referring now to FIG. 5, a flowchart illustrating operation of the microprocessor 100 of FIG. 1 to flush a stalled thread context to improve execution bandwidth utilization according to the present invention is shown. Flow begins at block 502.

At block 502, an execution unit 114 of FIG. 1 detects a stalling event, such as one of those described above with respect to the stalling events signal 126 of FIG. 1, in response to an instruction, i.e., the stalling instruction. The execution unit 114 also determines which thread context the stalling instruction is associated with, i.e., the stalling thread context. In one embodiment, each instruction, as it proceeds down the pipeline, is accompanied by a unique thread context identifier that the execution unit 114 uses to identify the stalling thread context. In one embodiment, the execution unit 114 does not stall in response to the stalling event 126, but instead flushes the instruction according to block 512 in the same clock cycle in which the stalling event 126 is detected, thereby alleviating a need to stall the execution unit 114. In another embodiment, if required by timing considerations, the execution unit 114 may actually stall for one clock cycle in response to the stalling event 126 until the stalled instruction can be flushed according to block 512 below. Flow proceeds to block 504.

At decision block 504, the execution unit 114 determines whether the stalling thread context is the only runnable thread context, by examining the runnable TCs signal 132 of FIG. 1. If so, flow proceeds to block 526; otherwise, flow proceeds to block 506.

At block 506, the execution unit 114 signals the stalling event via stalling events signal 126 and also provides the identifier of the stalling thread context. Flow proceeds to block 508.

Figure 7:
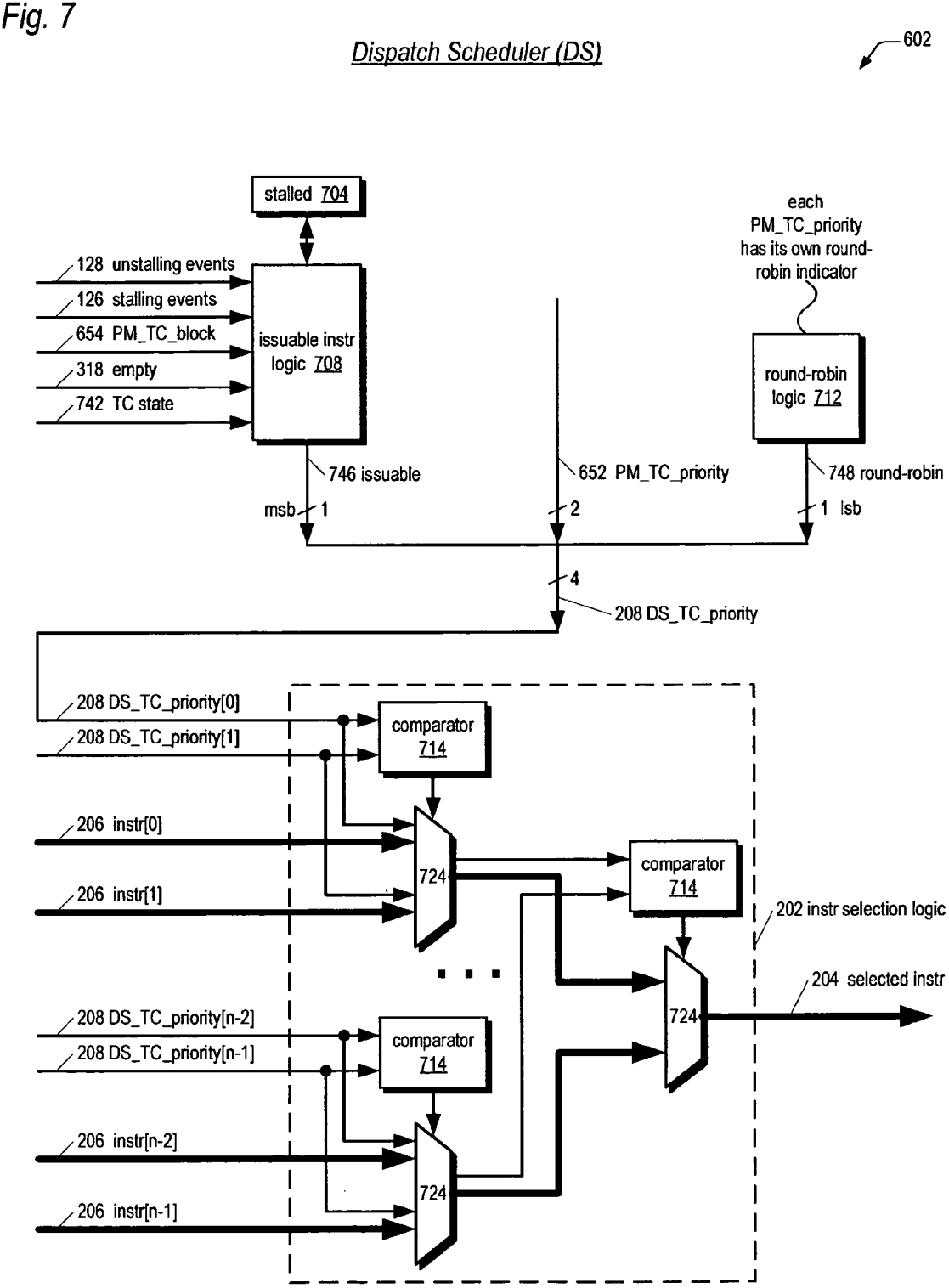
FIG. 7 is a block diagram illustrating in more detail the dispatch scheduler of FIG. 6 and the instruction selection logic of FIG. 2 according to the present invention.

At block 508, the scheduler 108 marks the stalling thread context stalled, stops issuing instructions for the thread context, and saves state regarding the cause of the stalling event. In the embodiment of FIG. 7, the issuable instruction logic 708 sets the stalled indicator 704 to a true value to mark the thread context stalled, which causes the issuable instruction logic 708 to generate a false value on the issuable 746 signal. Flow proceeds to block 512.

At block 512, the execution unit 114 nullifies, i.e., flushes, all instructions of the stalling thread context in the execution unit 114 and generates a true value on the TC_flush signal 122 of FIG. 1 associated with the stalling thread context, i.e., the flushed thread context. It is understood that the execution unit 114 only flushes the stalling instruction and subsequent instructions, but does not flush instructions preceding the stalling instructions; otherwise, the stalling condition might never end. In one embodiment, the execution unit 114 flushes instructions of all thread contexts, rather than just the stalling thread context. However, the embodiment that only flushes the stalling thread context has the advantage of potentially introducing fewer pipeline bubbles since instructions of other thread contexts may still be remaining in the execution unit 114 to execute, thereby potentially causing the microprocessor 100 to be more efficient than the embodiment that flushes all thread contexts. Flow proceeds to block 514.

At block 514, the instruction/skid buffer 106 of FIG. 1 rolls back the flushed instructions in response to the TC_flush signal 122, such as described with respect to embodiments of FIGS. 3 and 4, or 13 and 14, or 15. Flow proceeds to block 516.

At block 516, the scheduler 108 continues to issue instructions for thread contexts that are not marked stalled, according to its thread scheduling policy. In the embodiment of FIG. 7, the stalled indicator 704 indicates whether an instruction is stalled or unstalled. Additionally, the execution unit 114 continues to execute instructions of the other thread contexts that are in the execution unit 114 after the flush at block 512 and subsequently dispatched instructions. Flow proceeds to decision block 518.

At decision block 518, the scheduler 108 determines whether the stalling event terminated. The scheduler 108 determines whether the stalling event for the stalling thread context terminated in response to the execution unit 114 signaling an unstalling event via the unstalling events signal 128 of FIG. 1 and further based on the state regarding the cause of the stalling event saved at block 508. If the stalling event for the stalling thread context terminated, flow proceeds to block 522; otherwise, flow returns to block 516.

At block 522, the scheduler 108 marks the stalling thread context unstalled and begins issuing instructions for the (no longer) stalling thread context again, along with other non-stalled thread contexts. In the embodiment of FIG. 7, the issuable instruction logic 708 sets the stalled indicator 704 to a false value to mark the thread context unstalled. Flow ends at block 522.

At block 524, because the stalling thread context is the only runnable thread context, the execution unit 114 stalls at the stalling instruction in order to insure correct program execution. Flow proceeds to decision block 526.

At decision block 526, the scheduler 108 determines whether the stalling event terminated. If so, flow proceeds to block 534; otherwise, flow proceeds to decision block 528.

At decision block 528, the execution unit 114 determines whether the stalled thread context is the only runnable thread context, by examining the runnable TCs signal 132 of FIG. 1. If so, flow proceeds to block 526; otherwise, flow proceeds to decision block 528.

At decision block 528, the execution unit 114 determines whether the stalling thread context is still the only runnable thread context. If so, flow returns to decision block 526; otherwise, flow proceeds to block 506.

At block 532, the execution unit 114 unstalls and continues executing the (no longer) stalling instruction and other instructions. Advantageously, when the stalling event ends, the stalled instruction and subsequent instructions may commence execution immediately without having to be re-issued, which would be required if they had been flushed according to block 512. Thus, advantageously, by not flushing a stalling thread context if it is the only runnable thread context, the microprocessor 100 potentially improves performance. Flow ends at block 532.

As may be seen from FIG. 5, detecting a stalling event 126 in an execution unit 114 and flushing the instruction from the execution unit 114 to enable instructions of other threads to be dispatched to and executed in the execution unit 114 may advantageously make more efficient use of the execution unit 114 by avoiding wasted clock cycles due to execution pipeline bubbles. By flushing the instruction in response to an actual condition in which the instruction would stall, the microprocessor 100 potentially achieves higher performance.

Figure 6:
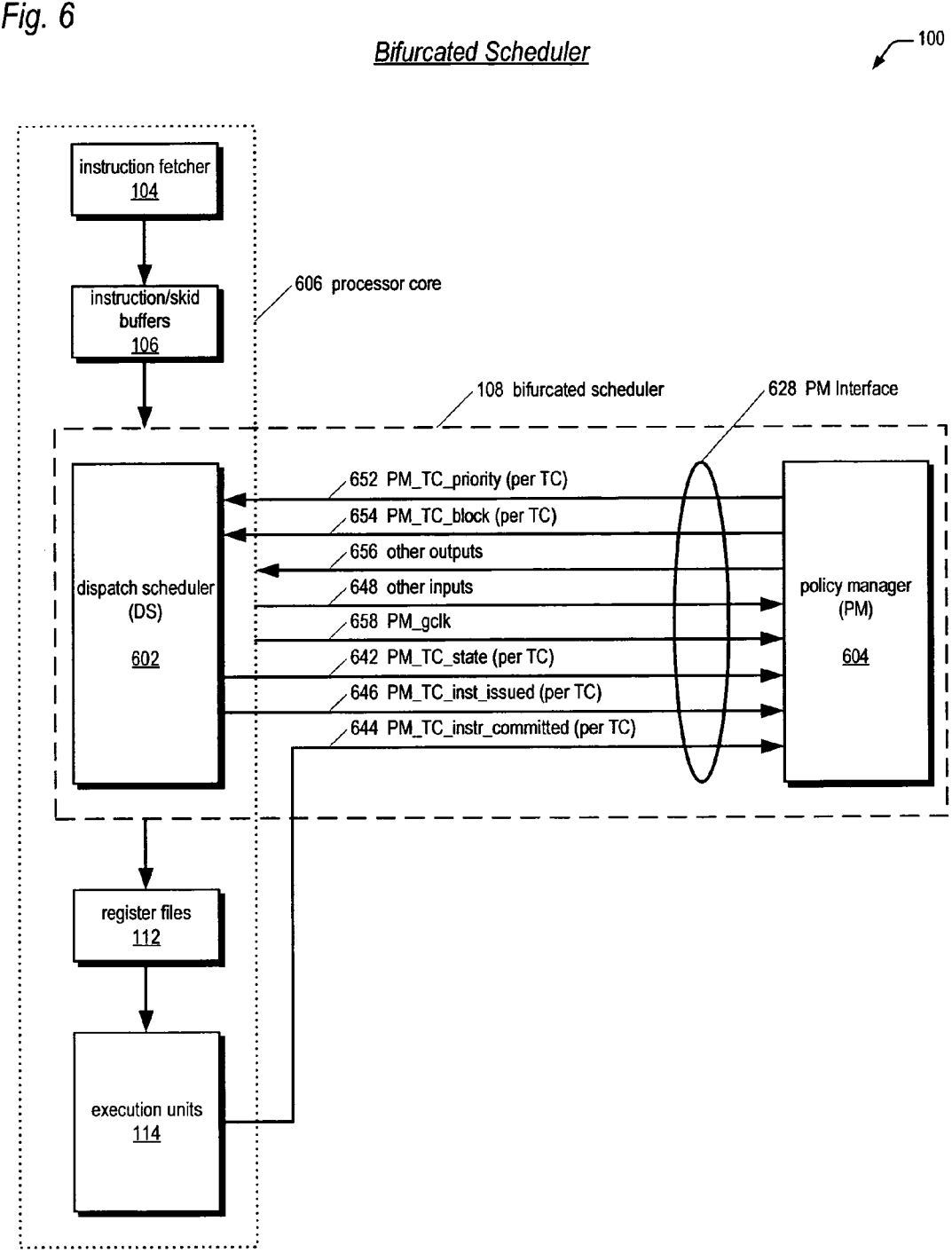
FIG. 6 is a block diagram illustrating the scheduler within the microprocessor of FIG. 1 according to one embodiment of the present invention in which the scheduler is bifurcated.

Referring now to FIG. 6, a block diagram illustrating the scheduler 108 within the microprocessor 100 of FIG. 1 according to one embodiment of the present invention in which the scheduler 108 is bifurcated is shown. The bifurcated scheduler 108 comprises a dispatch scheduler (DS) 602 portion and a policy manager (PM) 604 portion. The dispatch scheduler 602 portion is comprised within a processor core 606 of microprocessor 100; whereas, the policy manager 604 portion is comprised outside of the processor core 606. The processor core 606 is the portion of the microprocessor 100 that is not customizable by the customer; whereas, the policy manager 604 is customizable by the customer. In one embodiment, the processor core 606 is a synthesizable core, also referred to as a soft core. The design of a synthesizable core is capable of being reduced to a manufacturable representation quickly and easily using automated tools, commonly referred to as synthesis tools.

The processor core 606 provides an interface 628 to the policy manager 604 comprising a plurality of signals. In one embodiment, the inputs to the dispatch scheduler 602 and output signals from the dispatch scheduler 602 are registered, to advantageously enable the non-core policy manager 604 logic to interface with the processor core 606 in a manner that alleviates certain timing problems that might be otherwise introduced by a bifurcated scheduler. Furthermore, the interface 628 is easy for the customer to understand, which eases the design of the policy manager 604 scheduling policy.

In Table 1 below, the various signals comprising the policy manager interface 628 according to one embodiment are shown. Table 1 specifies the signal name, the direction of the signal relative to the policy manager 604, and a brief description of each signal. Table 1 describes an embodiment in which the microprocessor 100 includes nine thread contexts for storing state associated with up to nine threads of execution. Furthermore, the embodiment enables the microprocessor 100 to be configured as up to two virtual processing elements (VPEs). In one embodiment, the microprocessor 100 substantially conforms to a MIPS32 or MIPS64 Instruction Set Architecture (ISA) and includes a control Coprocessor 0, referred to in Table 1 as CP0, which includes thread control registers substantially conforming to a Coprocessor 0 specified in the MIPS Privileged Resource Architecture (PRA) and the MIPS Multithreading Application Specific Extension (MT ASE). Several of the signals described in Table 1 are used to access CP0 registers.

TABLE 1

| Signal Name | Direction | Description |
|---|---|---|
| PM_gclk | Input | Processor Clock |
| PM_gfclk | Input | Free running Processor Clock |
| PM_greset_pre | Input | Global Reset. Register before use. |
| PM_gscanenable | Input | Global Scan Enable. |
| PM_vpemap[8:0] | Input | Assignment of TCs to VPEs |
| | | Encoding    Meaning |
| | | 1#0    TC belongs to VPE 0 |
| | | 1#1    TC belongs to VPE 1 |
| PM_cp0_reg_ex | Input | Register number for CP0 read. |
| PM_cp0_sel_ex | Input | Register select for CP0 read. |
| PM_cp0_rvpe_ex | Input | VPE select for CP0 read. |
| PM_cp0_rtc_ex | Input | TG select for CP0 read. |
| PM_cp0_run_ex | Input | Clock Enable for register holding PM_cp0_rdata_ms. |
| PM_cp0_rdata_ms | Output | CP0 read data. Input to hold register controlled by PM_cp0_run_ex should be zero when PM CP0 registers not selected. |
| PM_cp0_wr_er | Input | CP0 register write strobe. |
| PM_cp0_reg_er | Input | Register number for CP0 write. |
| PM_cp0_sel_er | Input | Register select for CP0 write. |
| PM_cp0_wvpe_er | Input | VPE select for CP0 write. |
| PM_cp0_wtc_er | Input | TC select for CP0 write. |
| PM_cp0_wdata_er | Input | CP0 write data. |
| PM_vpe_dm[1:0] | Input | Debug Mode. DM bit of the CP0 Debug Register for the two VPEs. |

TABLE 1-continued

| Signal Name | Direction | Description |
| --- | --- | --- |
| PM_vpe_exl[1:0] | Input | Exception Level. EXL bit of the CP0 Status Register for the two VPEs. |
| PM_vpe_erl[1:0] | Input | Error Level. ERL bit of the CP0 Status Register for the two VPEs. |
| PM_tc_state_0[2:0] | Input | State of TC0.<br><br>Encoding   Meaning<br><br>3#000   InActive.<br>3#001   Active.<br>3#010   Yielded.<br>3#011   Halted.<br>3#100   Suspended.<br>3#101   Waiting on ITC.<br>3#110   WAITing due to WAIT.<br>3#111   Used as SRS. |
| PM_tc_state_1[2:0] | Input | State of TC 1. See PM_tc_state_0 for encoding. |
| PM_tc_state_2[2:0] | Input | State of TC 2. See PM_tc_state_0 for encoding. |
| PM_tc_state_3[2:0] | Input | State of TC 3. See PM_tc_state_0 for encoding. |
| PM_tc_state_4[2:0] | Input | State of TC 4. See PM_tc_state_0 for encoding. |
| PM_tc_state_5[2:0] | Input | State of TC 5. See PM_tc_state_0 for encoding. |
| PM_tc_state_6[2:0] | Input | State of TC 6. See PM_tc_state_0 for encoding. |
| PM_tc_state_7[2:0] | Input | State of TC 7. See PM_tc_state_0 for encoding. |
| PM_tc_state_8[2:0] | Input | State of TC 8. See PM_tc_state_0 for encoding. |
| PM_tc_ss[8:0] | Input | Single Stepping. SSt bit of the Debug Register for the 9 TCs. |
| PM_tc_inst_issued[8:0] | Input | Instruction issued by Dispatch Scheduler. |
| PM_tc_instr_committed[8:0] | Input | Instruction committed. |
| PM_tc_fork[8:0] | Input | FORK instruction has created a new TC. PM_tc_instr_committed contains which TC executed the FORK. |
| PM_tc_priority_0[1:0] | Output | Priority of TC 0. |
| PM_tc_priority_1[1:0] | Output | Priority of TC 1. |
| PM_tc_priority_2[1:0] | Output | Priority of TC 2. |
| PM_tc_priority_3[1:0] | Output | Priority of TC 3. |
| PM_tc_priority_4[1:0] | Output | Priority of TC 4. |
| PM_tc_priority_5[1:0] | Output | Priority of TC 5. |
| PM_tc_priority_6[1:0] | Output | Priority of TC 6. |
| PM_tc_priority_7[1:0] | Output | Priority of TC 7. |
| PM_tc_priority_8[1:0] | Output | Priority of TC 8. |
| PM_tc_block[8:0] | Output | Prevent Dispatch Scheduler from issuing instructions for selected TCs. |
| PM_vpe_relax_enable[1:0] | Output | Relax function Enabled for the two VPEs. |
| PM_vpe_relax_priority_0[1:0] | Output | Relax Priority of VPE 0. |
| PM_vpe_relax_priority_1[1:0] | Output | Relax Priority of VPE 1. |
| PM_vpe_exc_enable[1:0] | Output | Exception function Enabled for the two VPEs. |
| PM_vpe_exc_priority_0[1:0] | Output | Exception Priority of VPE 0. |
| PM_vpe_exc_priority_1[1:0] | Output | Exception Priority of VPE 1. |

Some of the particular signals of the policy manager interface 628 specified in Table 1 will now be described in more detail. The policy manager 604 specifies to the dispatch scheduler 602 the priority of the respective thread context via the PM_TC_priority 652 output. In one embodiment, the PM_TC_priority 652 comprises two bits and the dispatch scheduler 602 allows the policy manager 604 to specify one of four different priorities for a thread context. The policy manager 604 instructs the dispatch scheduler 602 to stop issuing instructions for a thread context by generating a true value on the respective PM_TC_block 654 output. Thus, the policy manager 604 may affect how the dispatch scheduler 602 issues instructions for the various thread contexts via the PM_TC_priority 652 and PM_TC_block 654 outputs, as described in more detail below, particularly with respect to FIGS. 7 through 11 below.

The processor core 606 provides the PM_gclk 658 to the policy manager 604, which enables the policy manager 604 to adjust the PM_TC_priority 652 periodically based on the PM_gclk 658, as described below with respect to FIG. 9. The dispatch scheduler 602 communicates the state for each thread context via respective PM_TC_state 642 input. As shown in Table 1, a thread context may be in one of eight states as follows. InActive: the dispatch scheduler 602 may not issue instructions of the thread context because the thread context is not currently associated with a thread of execution. Active: the thread context is currently associated with a thread of execution; therefore, the dispatch scheduler 602 may issue instructions of the thread context for execution if no other blocking conditions are present. Yielded: the dispatch scheduler 602 may not issue instructions of the thread context for execution because the thread has executed a YIELD instruction, which causes the thread context to be blocked on a specified event. Halted: the dispatch scheduler may not issue instructions of the thread context for execution because the thread context has been halted by itself or by another thread. Suspended: the dispatch scheduler 602 may not issue instructions of the thread context for execution because the thread executed a DMT or DVPE instruction, or because the microprocessor 100 or VPE is currently servicing an exception. A DMT instruction suspends multithreading operation for the VPE. A DVPE instruction suspends multithreading operation for the entire microprocessor 100. Waiting on ITC: the dispatch scheduler 602 may not issue instructions of the thread context for execution because the thread context is blocked waiting to load/store data from/to a location in inter-thread communication (ITC) space specified by a load/store instruction executed by the thread. WAITing due to WAIT: the dispatch scheduler 602 may not issue instructions of the thread context for execution because the thread has executed a WAIT instruction, which causes the thread context to be blocked until an interrupt has occurred. Used as SRS: the dispatch scheduler 602 may not issue instructions of the thread context because the thread context is not and cannot be associated with a thread of execution because the thread context register set is used for shadow register set operation.

The dispatch scheduler 602 communicates to the policy manager 604 that it has issued an instruction for a thread context via a respective PM_TC_inst_issued 646 input. The execution units 114 communicate to the policy manager 604 that they have committed an instruction of a thread context via a respective PM_TC_instr_committed 644 input. In one embodiment, the PM_TC_instr_committed 644 signal indicates execution of the instruction has been completed. In another embodiment, the PM_TC_instr_committed 644 signal indicates the instruction is guaranteed not to be flushed, i.e., to eventually complete execution, but may not have yet been completed. The salient point is that the PM_TC_instr_committed 644 input provides to the policy manager 604 information about executed instructions as opposed to merely dispatched instructions (as communicated by the PM_TC_inst_issued input 646), which may be different since some instructions may be speculatively dispatched and never complete. This may be an important distinction to the policy manager 604 since some threads in an application may require a particular quality-of-service, as discussed below with respect to FIG. 9. In one embodiment, the PM_TC_instr_committed signal 644 is a registered version of the TC_instr_committed signal 124. Thus, the processor core 606 provides feedback about the issuance and execution of instructions for the various thread contexts and state of the thread contexts via the PM_TC_inst_issued 646, PM_TC_instr_committed 644, and PM_TC_state 642 inputs, as described in more detail below, particularly with respect to FIGS. 7 through 11 below.

In one embodiment, the dispatch scheduler 602 also provides to the policy manager 604 a relax function, whose purpose is to enable the microprocessor 100 to save power when the application thread contexts do not require full processor bandwidth, without actually going to sleep. The relax function operates as if there is an additional thread context to be scheduled. However, when the relax thread context is selected for issue, the dispatch scheduler 602 does not issue an instruction. The policy manager 604 maintains a RELAX_LEVEL counter (per-VPE) that operates similar to the TC_LEVEL 918 counters (described below with respect to FIG. 9), except that it uses a RELAX_RATE for incrementing and is decremented when a relaxed instruction slot completes. In one embodiment, the microprocessor 100 includes a VPESchedule register per-VPE similar to the TCSchedule register 902 that enables software to specify the RELAX_RATE. The relax function is enabled or disabled via the PM_vpe_relax_enable signals specified in Table 1, and the relax thread context priority is specified via the PM_vpe_relax_priority signals.

In one embodiment, the dispatch scheduler 602 also provides to the policy manager 604 an exception function, whose purpose is to enable an exception thread context to have its own independent priority from the normal thread contexts. The policy manager maintains an EXC_LEVEL counter (per-VPE) that operates similar to the TC_LEVEL 918 counters (described below with respect to FIG. 9), except that it uses an EXC_RATE for incrementing and is decremented when an exception instruction slot completes. When the exception mode is enabled and an exception is taken for the VPE, then the thread contexts of the VPE will all be set to the exception priority. In one embodiment, software specifies the EXC_RATE via the VPESchedule registers. The exception function is enabled or disabled via the PM_vpe_exc_enable signals specified in Table 1, and the exception thread context priority is specified via the PM_vpe_exc_priority signals.

Referring now to FIG. 7, a block diagram illustrating in more detail the dispatch scheduler 602 of FIG. 6 and the instruction selection logic 202 of FIG. 2 according to the present invention is shown. The instruction selection logic 202 includes a tree of muxes 724 controlled by comparators 714. Each mux 724 receives an instruction 206 of FIG. 2 from two different thread contexts. Each mux 724 also receives the instruction's 206 associated DS_TC_priority 208 of FIG. 2. The comparator 714 associated with each mux 724 also receives the pair of DS_TC_priority signals for the two thread contexts and controls its associated mux 724 to select the instruction 206 and DS_TC_priority 208 with the highest DS_TC_priority 208 value. The selected instructions 206 and DS_TC_priorities 208 propagate down the tree until the final mux 724 selects the selected instruction 204 of FIG. 2 with the highest DS_TC_priority 208 for provision to the execution pipeline.

FIG. 7 shows logic of the dispatch scheduler 602, namely a stalled indicator 704, issuable instruction logic 708, and round-robin logic 712. In one embodiment, the stalled indicator 704 and issuable instruction logic 708 are replicated within the dispatch scheduler 602 for each thread context to generate a DS_TC_priority 208 for each thread context. In contrast, the round-robin logic 712 is instantiated once for each possible PM_TC_priority 652 and generates a round-robin indicator for each PM_TC_priority 652. For example, FIG. 7 illustrates an embodiment in which the policy manager 604 may specify one of four possible PM_TC_priorities 652; hence, the round-robin logic 712 is instantiated four times in the dispatch scheduler 602 and generates four respective round-robin indicators.

In one embodiment, the round-robin indicator includes one bit per thread context of the microprocessor 100. The bit of the round-robin indicator associated with its respective thread context is provided as round-robin bit 748 as shown in FIG. 7. If the round-robin bit 748 is true, then it is the thread context's turn in the round-robin scheme to be issued among the other thread contexts that are currently at the same PM_TC_priority 652.

The issuable instruction logic 708 receives the unstalling events signal 128 and stalling events signal 126 from the execution units 114 of FIG. 1, the PM_TC_block 654 signal from the policy manager 604 of FIG. 6, the empty signal 318 of FIG. 3 from the instruction/skid buffer 106, and TC state 742 signals. In one embodiment, the TC state 742 signals convey similar information to the PM_TC_state 642 signals of FIG. 6. The issuable instruction logic 708 sets the stalled indicator 704 to mark the thread context stalled in response to a stalling events signal 126 that identifies the thread context. The issuable instruction logic 708 also stores state in response to the stalling event 126 to remember the cause of the stall. Conversely, the issuable instruction logic 708 clears the stalled indicator 704 in response to an unstalling events signal 128 if the unstalling event 128 is relevant to the cause of the stall. The issuable instruction logic 708 generates an issuable 746 signal in response to its inputs. The issuable 746 signal is true if the instruction 206 pointed to by the read pointer 326 of the instruction/skid buffer 106 for the thread context is issuable. In one embodiment, an instruction is issuable if the TC state signals 742 indicate the thread context is in the Active state and is not blocked by other conditions (such as being Halted, Waiting, Suspended, or Yielded), the stalled indicator 704 is false, and the PM_TC_block 654 and empty 318 signals are false.

The issuable 746 bit, the PM_TC_priority 652 bits, and the round-robin bit 748 are combined to create the DS_TC_priority 208. In the embodiment of FIG. 7, the issuable 746 bit is the most significant bit, the round-robin bit 748 is the least significant bit, and the PM_TC_priority 652 is the two middle significant bits. As may be observed, because the issuable bit 746 is the most significant bit of the DS_TC_priority 652, a non-issuable instruction will be lower priority than all issuable instructions. Conversely, the round-robin bit 748 is only used to select a thread if more than one thread context has an issuable instruction and has the same highest PM_TC_priority 652.

Figure 8:
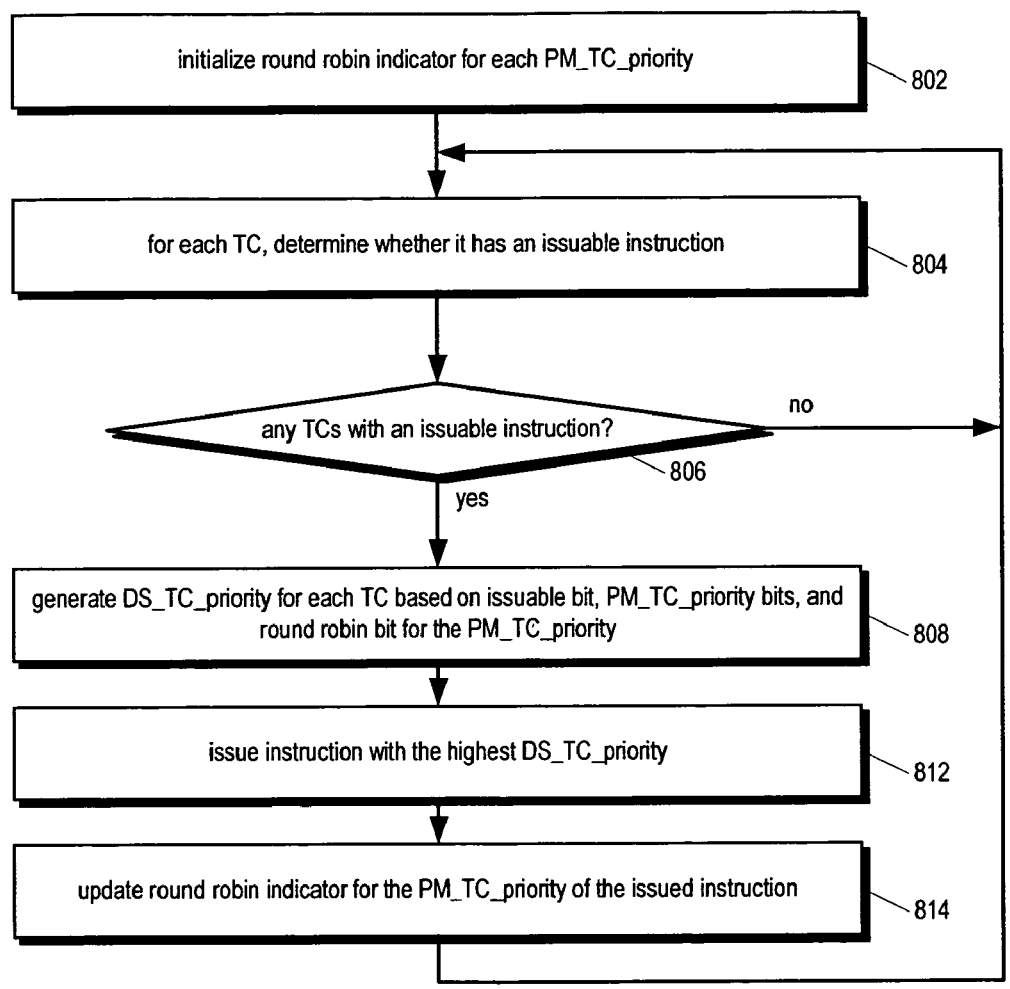
FIG. 8 is a flowchart illustrating operation of the dispatch scheduler of FIG. 7 according to the present invention.

Referring now to FIG. 8, a flowchart illustrating operation of the dispatch scheduler 602 of FIG. 7 according to the present invention is shown. Flow begins at block 802.

At block 802, the dispatch scheduler 602 initializes each round-robin indicator for each PM_TC_priority 652. Flow proceeds to block 804.

At block 804, the dispatch scheduler 602 determines, for each thread context, whether the thread context has an issuable instruction 206. That is, the issuable instruction logic 708 for each thread context generates a value on the issuable 746 signal. In one embodiment, the issuable instruction logic 708 generates a true signal on the issuable 746 signal only if the TC state signals 742 indicate the thread context is in the Active state and is not blocked by other conditions (such as being Halted, Waiting, Suspended, or Yielded), the stalled indicator 704 is false, and the PM_TC_block 654 and empty 318 signals are false. Flow proceeds to decision block 806.

At decision block 806, the dispatch scheduler 602 determines, by examining the issuable 746 signal for each of the thread contexts, whether there are any thread contexts that have an issuable instruction 206. If not, flow returns to block 804 until at least one thread context has an issuable instruction 206; otherwise, flow proceeds to block 808.

At block 808, the dispatch scheduler 602 generates the DS_TC_priority 208 for the instruction 206 of each thread context based on the issuable 746 bit of the thread context, the PM_TC_priority 652 of the thread context, and the round-robin bit 748 of the PM_TC_priority 652 of the thread context. Flow proceeds to block 812.

At block 812, the dispatch scheduler 602 issues the instruction 206 with the highest DS_TC_priority 208. In other words, the dispatch scheduler 602 issues the instruction from the thread context that has an issuable instruction and has the highest PM_TC_priority 652. If multiple thread contexts meet that criteria, the dispatch scheduler 602 issues the instruction from the thread context whose turn it is to issue as indicated by the round-robin bit 748 for the PM_TC_priority 652 of the thread contexts. Flow proceeds to block 814.

At block 814, the round-robin logic 712 updates the round-robin indicator for the PM_TC_priority 652 based on which of the thread contexts was selected to have its instruction issued. Flow returns to block 804.

Figure 9:
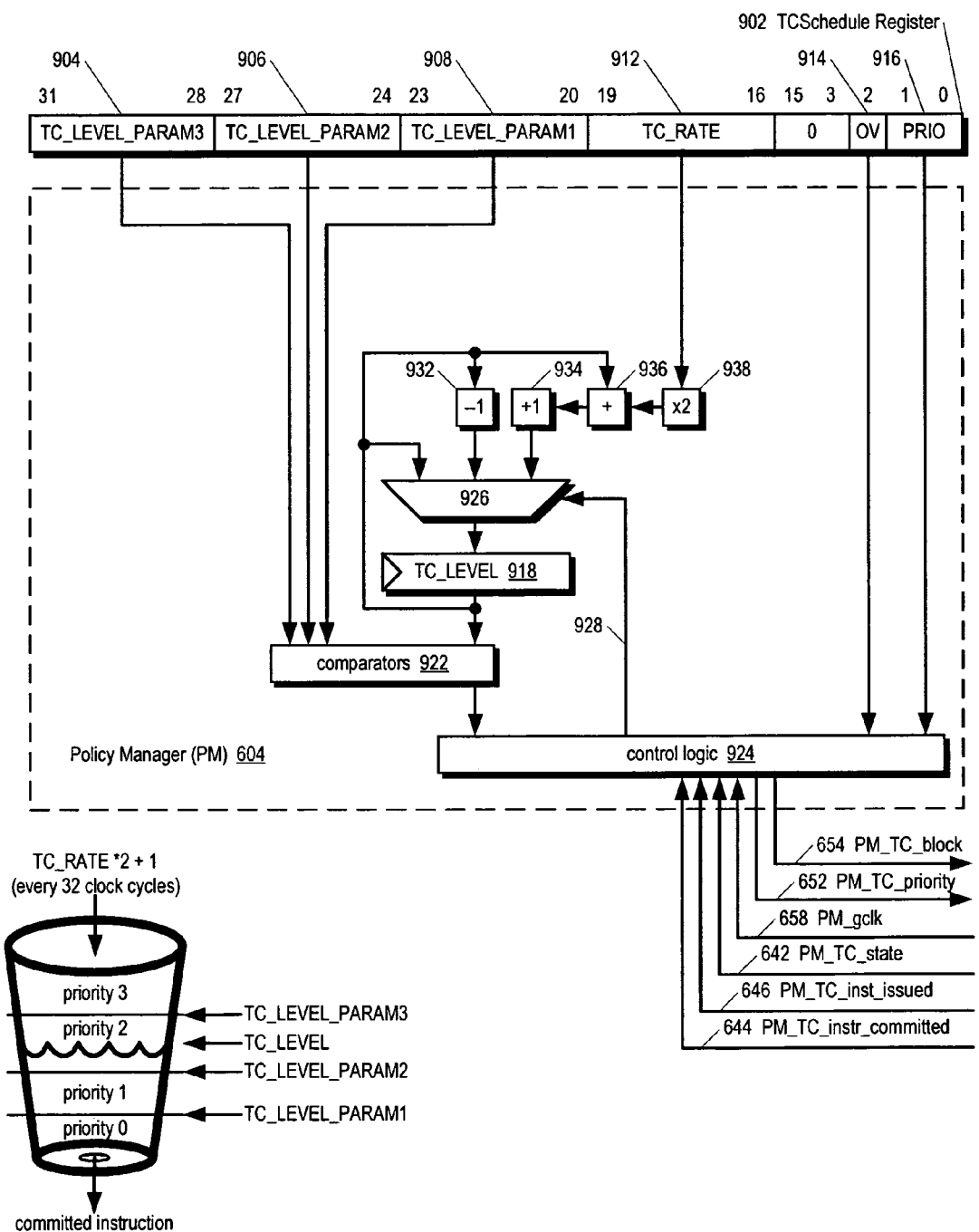
FIG. 9 is a block diagram illustrating the policy manager of FIG. 6 and a TCSchedule register according to the present invention.

Referring now to FIG. 9, a block diagram illustrating the policy manager 604 of FIG. 6 and a TCSchedule register 902 according to the present invention is shown.

The microprocessor 100 includes a TCSchedule register 902 for each thread context. The TCSchedule register 902 is software-programmable and provides a means for software to provide a thread scheduling hint to the policy manager 604. In one embodiment, the TCSchedule register 902 is comprised within the Coprocessor 0 register discussed above with respect to FIG. 6 and Table 1, and in particular is comprised within the policy manager 604. The TCSchedule register 902 includes six fields: TC_LEVEL_PARAM1 908, TC_LEVEL_PARAM2 906, TC_LEVEL_PARAM3 904, TC_RATE 912, OV 914, and PRIO 916. In the embodiment of FIG. 9, the TC_LEVEL_PARAM1 908, TC_LEVEL_PARAM2 906, TC_LEVEL_PARAM3 904, and TC_RATE 912 fields comprise four bits, the PRIO 916 field comprises two bits, and the OV 914 field is a single bit.

The policy manager 604 logic shown in FIG. 9 comprises control logic 924; comparators 922 coupled to provide their output to the control logic 924; a TC_LEVEL 918 register coupled to provide its output as an input to the comparators 924; and a three-input mux 926 that is coupled to provide its output as the input to the TC_LEVEL 918 register. The mux 926 receives on its first input the output of the TC_LEVEL 918 register for retaining the correct value. The mux 926 receives on its second input the output of a decrementer 932 whose input is the output of the TC_LEVEL 918 register. The mux 926 receives on its third input the output of an incrementer 934 whose input is the output of an adder 936 that adds the output of the TC_LEVEL 918 register and the output of a multiplier 938 that multiplies the TC_RATE 912 by 2. The TC_RATE 912 is an indication of the desired execution rate of the thread context, i.e., the number of instructions to be completed per unit time. In the embodiment of FIG. 9, the TC_RATE 912 indicates the number of instructions of the thread that should be completed every 16 clock cycles. Although the logic just listed is shown only once in FIG. 9, the logic is replicated within the policy manager 604 for each thread context to generate the PM_TC_block 654 and PM_TC_priority 652 signals and to receive the PM_TC_state 642, PM_TC_inst_committed 644, PM_TC_inst_issued 646, and PM_gclk 658 signals for each thread context.

The policy manager 604 employs a modified leaky-bucket algorithm to accomplish the high-level thread scheduling policy of the scheduler 108. The TC_LEVEL 918 register is analogous to the water level in a bucket. The TC_LEVEL 918 is essentially a measure of the amount of work that needs to be done by the thread context. In one embodiment, the TC_LEVEL 918 register comprises a 12-bit register initialized to zero. The control logic 924 generates a control signal 928 to control which input the mux 926 selects. Every 32 clock cycles, the mux 926 selects the output of the incrementer 936 for storing in the TC_LEVEL 918 register, which increases the TC_LEVEL 918 by the quantity (TC_RATE*2+1). In one embodiment, the number of clock cycles between updates of the TC_LEVEL 918 based on the TC_RATE 912 is also programmable. On other clock cycles, the mux 926 selects the output of the decrementer 932 to decrement the TC_LEVEL 918 if the PM_TC_instr_committed signal 644 indicates an instruction for the thread context has been committed for execution. Thus, software can affect the virtual water level in the thread context's bucket by adjusting the TC_RATE 912 value of the thread's TCSchedule register 902. In the embodiment of FIG. 9, the value of the TC_RATE 912 indicates the number of instructions per 16 clock cycles it is desired for the microprocessor 100 to execute for the thread context.

As the water level in a leaky bucket increases, so does the water pressure, which causes the water to leak out at a higher rate. Analogously, the TC_LEVEL_PARAM fields 904/906/908 are programmed with monotonically increasing values that define virtual water pressure ranges. The comparators 922 compare the TC_LEVEL 918 with the TC_LEVEL_PARAMs 904/906/908 and provide their result to the control logic 924, which generates the PM_TC_priority 652 based on which of the virtual water pressure ranges the TC_LEVEL 918 falls in. As illustrated by the leaky bucket of FIG. 9, the control logic 924 generates a PM_TC_priority 652 value of 3 (the highest priority) if the most significant nibble of the TC_LEVEL 918 is above the TC_LEVEL_PARAM3 904 value; the control logic 924 generates a PM_TC_priority 652 value of 2 if the most significant nibble of the TC_LEVEL 918 is between the TC_LEVEL_PARAM3 904 value and the TC_LEVEL_PARAM2 906 value; the control logic 924 generates a PM_TC_priority 652 value of 1 if the most significant nibble of the TC_LEVEL 918 is between the TC_LEVEL_PARAM2 906 value and the TC_LEVEL_PARAM1 908 value; and the control logic 924 generates a PM_TC_priority 652 value of 0 (the lowest priority) if the most significant nibble of the TC_LEVEL 918 is below the TC_LEVEL_PARAM1 908 value. Analogously, increasing the PM_TC_priority 652 level increases the pressure on the dispatch scheduler 602 to issue instructions for the thread context, while decreasing the PM_TC_priority 652 level decreases the pressure on the dispatch scheduler 602 to issue instructions for the thread context.

As discussed above, in some applications using the microprocessor 100, different threads may require different instruction execution rates, which is programmable using the TC_RATE 912 field. Furthermore, different threads may require different resolutions, i.e., the period of time over which the instruction execution rate is measured. That is, some threads, although perhaps not requiring a high execution rate, may not be starved for instruction execution beyond a minimum time period. That is, the thread requires a particular quality-of-service. As may be observed from FIG. 9 and the explanation thereof, the TC_LEVEL_PARAMs 904/906/908 may be employed to accomplish a required resolution for each thread. By assigning TC_LEVEL_PARAMs 904/906/908 that are relatively close to one another, a higher resolution may be accomplished; whereas, assigning TC_LEVEL_PARAMs 904/906/908 that are relatively far apart, creates a lower resolution. Thus, software may achieve the desired quality-of-service goals via the policy manager 604 by adjusting the TC_LEVEL_PARAMs 904/906/908 for each thread context to achieve the needed resolution on the instruction execution rate.

If the OV bit 914 is set, the control logic 924 ignores the values of the TC_LEVEL_PARAMs 904/906/908, TC_RATE 912, and TC_LEVEL 918, and instead generates a value on the PM_TC_priority 652 signal equal to the value specified in the PRIO field 916. This allows software to bypass the leaky bucket policy and directly control the priority of one or more of the thread contexts, if necessary.

In one embodiment, if the TC_LEVEL 918 saturates to its maximum value for a predetermined number of clock cycles, then the microprocessor 100 signals an interrupt to enable software to make thread scheduling adjustments at a higher level, in particular by changing the values in one or more of the TCSchedule registers 902. In one embodiment, the interrupt may be masked by software.

In one embodiment, the microprocessor 100 instruction set includes a YIELD instruction, which a thread context may execute to instruct the scheduler 108 to stop issuing instructions for the thread context until a specified event occurs. In one embodiment, when a thread is YIELDed, the policy manager 604 temporarily disables updates of the thread's TC_LEVEL 918 so that the thread's PM_TC_priority is preserved until the thread becomes unYIELDed. In another embodiment, the policy manager 604 continues to update the thread's TC_LEVEL 918, likely causing the thread's PM_TC_priority to increase, such that when the thread becomes unYIELDed it will temporarily have a high priority to aid the thread in essentially priming its pump. In one embodiment, the behavior of the policy manager 604 toward a YIELDed thread is programmable by software.

It should be understood that although an embodiment is described in which specific numbers of bits are used to specify the PM_TC_priority 652, TC_LEVEL_PARAMs 904/906/908, TC_RATE 912, TC_LEVEL 918, etc., the scheduler 108 is not limited in any way to the values used in the embodiment; rather, the scheduler 108 may be configured to use various different number of bits, priorities, levels, rates, etc. as required by the particular application in which the microprocessor 100 is to be used. Furthermore, although a policy manager 604 has been described which employs a modified leaky-bucket thread scheduling policy, it should be understood that the policy manager 604 may be configured to employ any of various thread scheduling policies while still enjoying the benefits of a bifurcated scheduler 108. For example, in one embodiment, the policy manager 604 employs a simple round-robin thread scheduling policy in which the PM_TC_priority 652 outputs for all the thread contexts are tied to the same value. In another embodiment, the policy manager 604 employs a time-sliced thread scheduling policy in which the PM_TC_priority 652 output is raised to the highest priority for one thread context for a number of consecutive clock cycles specified in the TCSchedule register 902 of the thread context, then the PM_TC_priority 652 output is raised to the highest priority for another thread context for a, perhaps different, number of consecutive clock cycles specified in the TCSchedule register 902 of the thread context, and so on for each thread context in a time-sliced fashion.

In one embodiment, the microprocessor 100 instruction set includes a FORK instruction for allocating an available thread context and scheduling execution of a new thread within the newly allocated thread context. In one embodiment, when a thread context FORKs a new thread context, the TC_RATE 912 for the parent thread context is split between itself and the child thread context evenly, i.e., the new TC_RATE 912 is the old TC_RATE 912 divided by two. This has the advantage of preventing a thread context from requesting more processing bandwidth than originally allotted.

As may be observed from the foregoing, bifurcating the scheduler 108 enables the dispatch scheduler 602, which is included in the processor core 606, to be relatively simple, which enables the dispatch scheduler 602 to be relatively small in terms of area and power, and places the application-specific complexity of the thread scheduling policy in the policy manager 604, which is outside the processor core 606. This is advantageous since some applications may not require a complex policy manager 604 and can therefore not be burdened with the additional area and power requirements that would be imposed upon all applications if the scheduler 108 were not bifurcated, as described herein.

Figure 10:
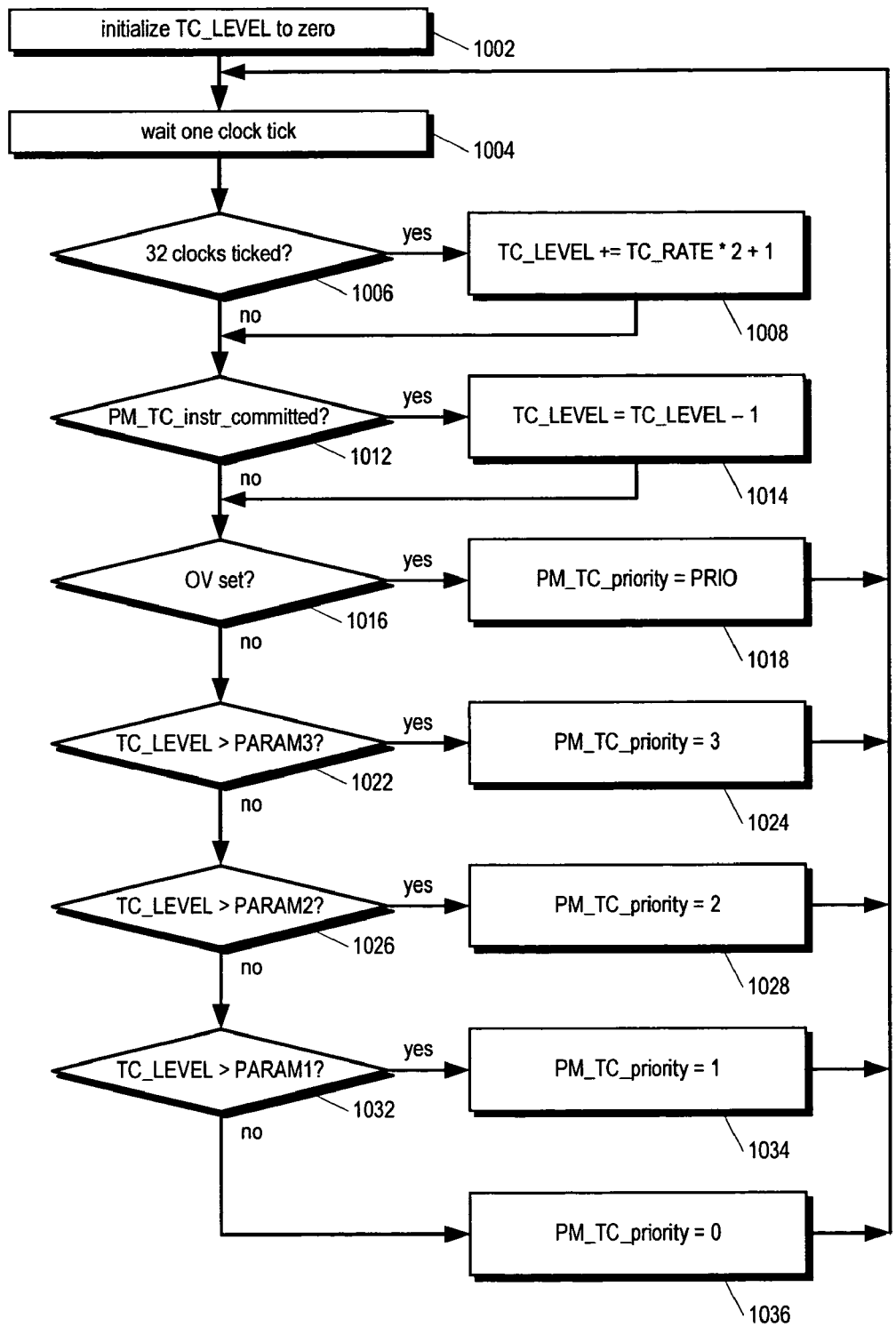
FIG. 10 is a flowchart illustrating operation of the policy manager of FIG. 9 according to the present invention.

Referring now to FIG. 10, a flowchart illustrating operation of the policy manager 604 of FIG. 9 according to the present invention is shown. Although operation is shown for only a single thread context in FIG. 10, the operation specified in FIG. 10 occurs within the policy manager 604 for each thread context. Flow begins at block 1002.

At block 1002, the policy manager 604 initializes the TC_LEVEL 918 to zero. Flow proceeds to block 1004.

At block 1004, the policy manager 604 waits one tick of the PM_gclk 658. Flow proceeds to decision block 1006.

At decision block 1006, the policy manager 604 determines whether 32 PM_gclks 658 have ticked since the last time flow arrived at decision block 1006. If not flow proceeds to decision block 1012; otherwise, flow proceeds to block 1008.

At block 1008, the TC_LEVEL 918 is increased by twice the value of TC_RATE 912 plus one. Flow proceeds to decision block 1012.

At decision block 1012, the policy manager 604 determines whether PM_TC_instr_committed 644 is true. If not, flow proceeds to decision block 1016; otherwise, flow proceeds to block 1014.

At block 1014, the TC_LEVEL 918 is decremented. Flow proceeds to decision block 1016.

At decision block 1016, the policy manager 604 determines whether the OV bit 914 is set. If not, flow proceeds to decision block 1022; otherwise, flow proceeds to block 1018.

At block 1018, the policy manager 604 generates a value on PM_TC_priority 652 equal to the value of the PRIO 916 field. Flow returns to block 1004.

At decision block 1022, the policy manager 604 determines whether the TC_LEVEL 918 is greater than the TC_LEVEL_PARAM3 904 value. If not, flow proceeds to decision block 1026; otherwise, flow proceeds to block 1024.

At block 1024, the policy manager 604 generates a value of 3 (the highest priority) on PM_TC_priority 652. Flow returns to block 1004.

At decision block 1026, the policy manager 604 determines whether the TC_LEVEL 918 is greater than the TC_LEVEL_PARAM2 906 value. If not, flow proceeds to decision block 1032; otherwise, flow proceeds to block 1028.

At block 1028, the policy manager 604 generates a value of 2 on PM_TC_priority 652. Flow returns to block 1004.

At decision block 1032, the policy manager 604 determines whether the TC_LEVEL 918 is greater than the TC_LEVEL_PARAM1 908 value. If not, flow proceeds to block 1036; otherwise, flow proceeds to block 1034.

At block 1034, the policy manager 604 generates a value of 1 on PM_TC_priority 652. Flow returns to block 1004.

At block 1036, the policy manager 604 generates a value of 0 (lowest priority) on PM_TC_priority 652. Flow returns to block 1004.

Figure 11:
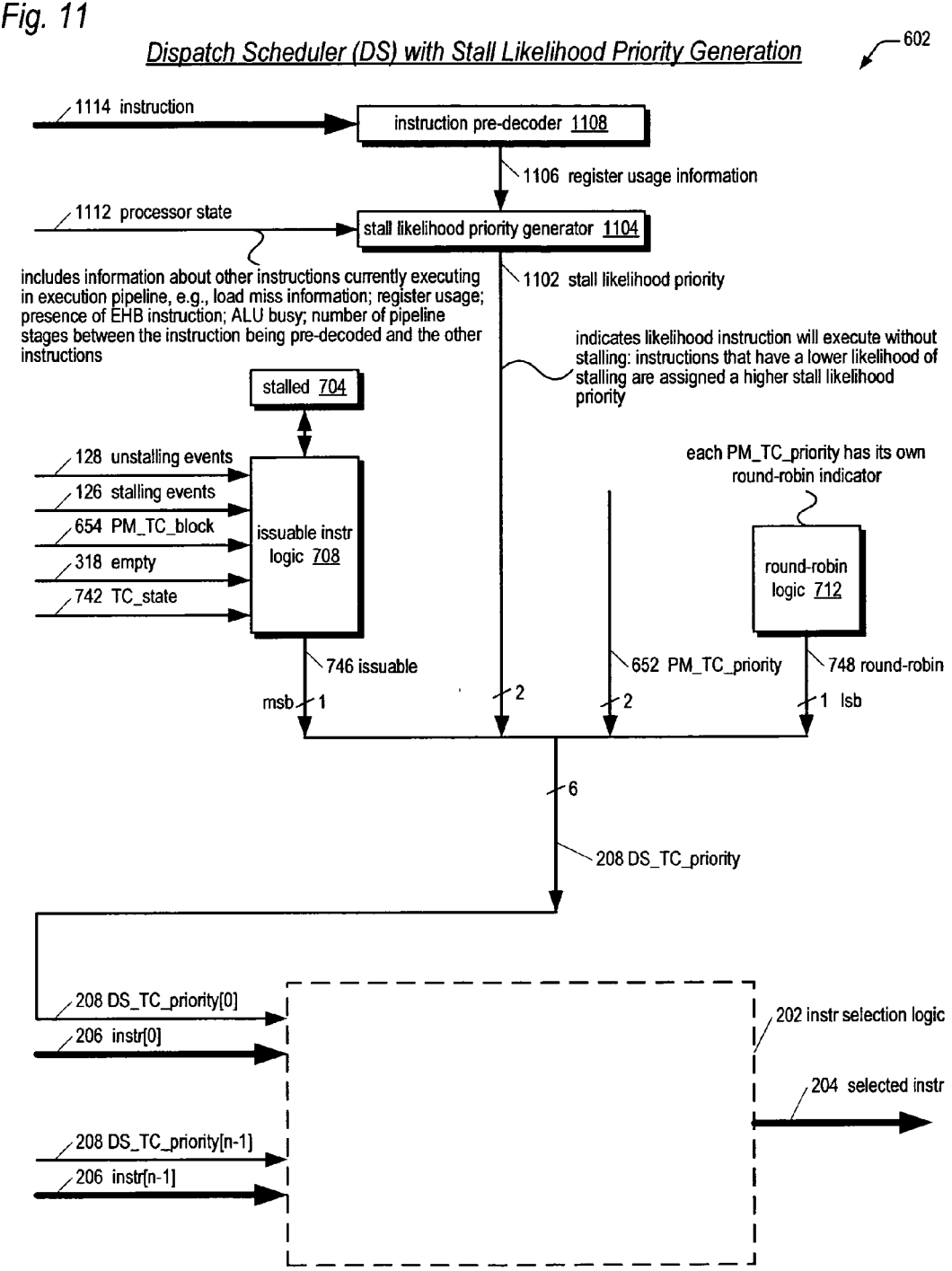
FIG. 11 is a block diagram illustrating in more detail the dispatch scheduler of FIG. 6 and the instruction selection logic of FIG. 2 according to an alternate embodiment of the present invention.

Referring now to FIG. 11, a block diagram illustrating in more detail the dispatch scheduler 602 of FIG. 6 and the instruction selection logic 202 of FIG. 2 according to an alternate embodiment of the present invention is shown. The embodiment of FIG. 11 is similar to the embodiment of FIG. 7; however, the dispatch scheduler 602 of the embodiment of FIG. 11 also includes an instruction pre-decoder 1108 and a stall likelihood priority generator 1104. The pre-decoder 1108 pre-decodes an instruction 1114 to generate register usage information 1106 about the instruction 1114. In one embodiment, the register usage information 1106 specifies which registers of the register file 112 are used as source registers of the instruction and in which stage of the execution pipeline 114 the source register is needed. Additionally, the register usage information 1106 specifies which register of the register file 112 is a destination register of the instruction and at which stage of the execution pipeline 114 the result of the instruction is ready to be stored into the destination register.

The stall likelihood priority generator 1104 generates a stall likelihood priority 1102 for the instruction 1114 based on the register usage information and based on processor state information 1112 received from the microprocessor 100 pipeline. The processor state information 1112 may include, but is not limited to: whether a load has missed in the data cache 118; whether the missing load has already been fetched; the register usage (which may include the register usage information 1106 generated by the instruction pre-decoder 1108), particularly the destination register, of other instructions currently being executed in the execution pipeline; the presence of an EHB instruction in the execution pipeline; whether an ALU is presently busy executing another ALU instruction; the number of pipeline stages currently between the instruction being pre-decoded and the other instructions in the execution pipeline; etc. In the embodiment of FIG. 11, the stall likelihood priority 1102 comprises two bits that are included between the issuable bit 746 and the PM_TC priority bits 652 to form a 6-bit DS_TC_priority 208 of FIG. 2 for use by the instruction selection logic 202 to select the selected instruction 204 of FIG. 2. In an alternate embodiment, the two bits of the stall likelihood priority 1102 are interleaved with the two bits of the PM_TC_priority 652. In one embodiment, the bits are interleaved in the following order from most to least significant: MSB of stall likelihood priority 1102, MSB of PM_TC_priority 652, LSB of stall likelihood priority 1102, LSB or PM_TC_priority 652. This embodiment is an interleaved embodiment conducive to maintaining high overall throughput by the execution pipeline 114.

The stall likelihood priority 1102 indicates the likelihood that the instruction will be executed without stalling based on its register usage. In one embodiment, the stall likelihood priority 1102 comprises two bits, creating four priority levels, and is generated by the stall likelihood priority generator 1104 as follows. An instruction is assigned the highest stall likelihood priority 1102 if it is guaranteed not to stall. For example, the instruction has no register dependencies; or the instruction has enough spacing of pipeline stages between itself and an instruction with which it has a dependency; or the data needed by the instruction is available, such as because missing load data has been returned or because the result of a previous instruction is now available, and therefore the dependency is no longer present. An instruction is assigned the lowest stall likelihood priority 1102 if it is guaranteed to stall. For example, the instruction follows a currently executing EHB instruction; the instruction is a load from an uncacheable memory region; the instruction is a load/store from/to a location in inter-thread communication (ITC) space; or the instruction cannot be executed back-to-back with another instruction in front of it due to a dependency, such as a register dependency. A cacheable load instruction is assigned a next to lowest priority. An instruction is assigned a next to highest priority of it is not guaranteed not to stall, but has a high likelihood of not stalling, such as, for example in one embodiment, an instruction that is dependent upon a result of a multiply, divide, or a floating-point instruction.

In one embodiment, the instruction 1114 is the instruction 206 of FIG. 2 at the read pointer 326 of the instruction/skid buffer 106 for the thread context, i.e., the instruction 206 of the thread context that is the next instruction eligible for issuing. In another embodiment, to improve timing considerations, the instruction pre-decoder 1108 generates the register usage information 1106 for instructions 1114 as they are stored into the instruction/skid buffer 106 of FIG. 1 and stores the register usage information 1106 into the instruction/skid buffer 106 along with the instruction 1114. As the instruction 1114/206 is being read from the instruction/skid buffer 106, the pre-decoded register usage information 1106 is provided to the stall likelihood priority generator 1104 at that time. That is, in this embodiment, the instruction/skid buffers 106 are coupled between the instruction pre-decoder 1108 and the stall likelihood priority generator 1104.

Figure 12:
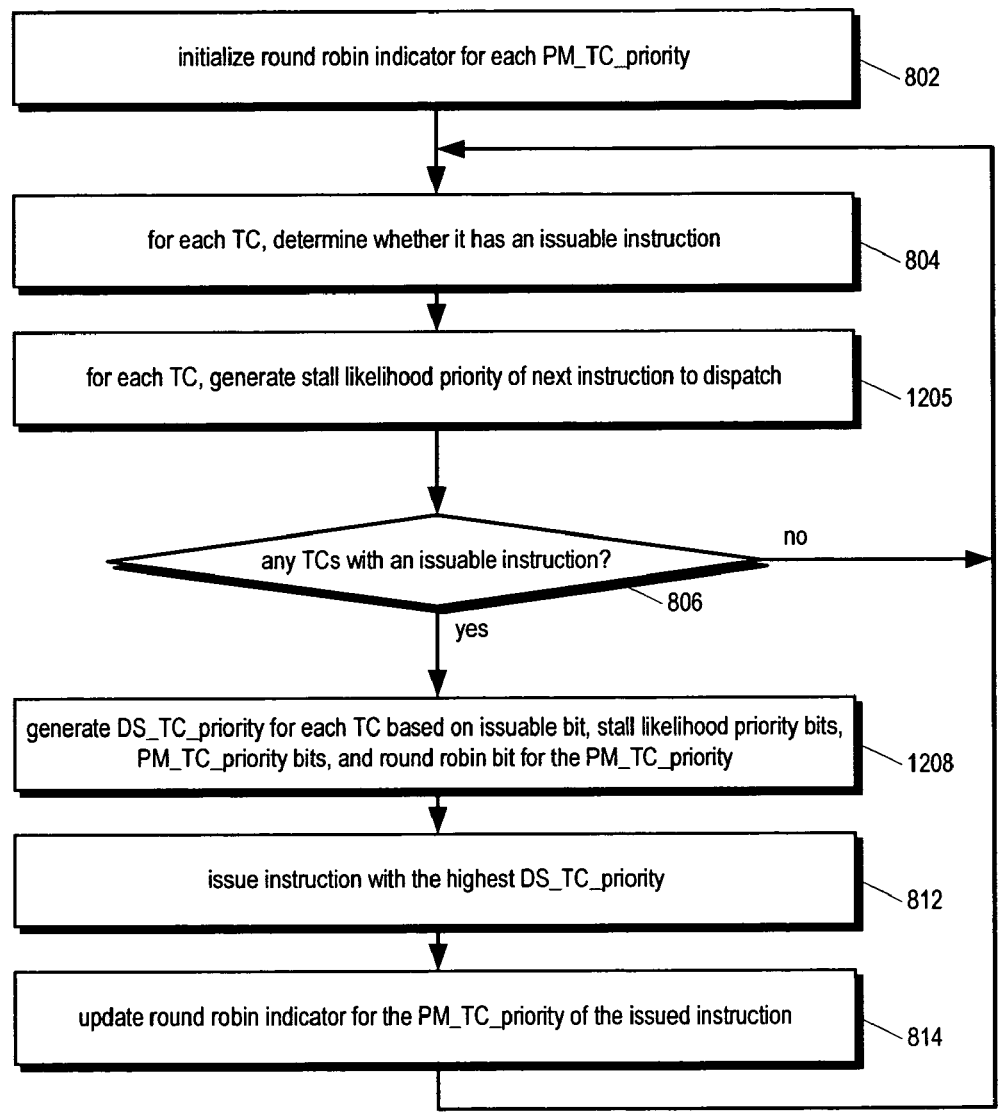
FIG. 12 is a flowchart illustrating operation of the dispatch scheduler of FIG. 11 according to the present invention.

Referring now to FIG. 12, a flowchart illustrating operation of the dispatch scheduler 602 of FIG. 11 according to the present invention is shown. The flowchart of FIG. 12 is similar to the flowchart of FIG. 8, and like-numbered blocks are alike. However, in the flowchart of FIG. 12, block 808 is replaced with block 1208. Additionally, the flowchart of FIG. 12 includes an additional block 1205. Flow proceeds from block 804 to block 1205.

At block 1205, for each thread context, the stall likelihood priority generator 1104 generates the stall likelihood priority 1102 for the instruction 1114 based on the processor state 1112 and the register usage information 1106 of the instruction 1114 of FIG. 11. Flow proceeds from block 1205 to decision block 806.

At decision block 806, the dispatch scheduler 602 determines, by examining the issuable 746 signal for each of the thread contexts, whether there are any thread contexts that have an issuable instruction 206. If not, flow returns to block 804 until at least one thread context has an issuable instruction 206; otherwise, flow proceeds to block 1208.

At block 1208, the dispatch scheduler 602 generates the DS_TC_priority 208 for the instruction 206 of each thread context based on the issuable 746 bit of the thread context, the stall likelihood priority 1102 of the next instruction 206 to dispatch for the thread context, the PM_TC_priority 652 of the thread context, and the round-robin bit 748 of the PM_TC_priority 652 of the thread context. Flow proceeds from block 1208 to block 812.

Figure 13:
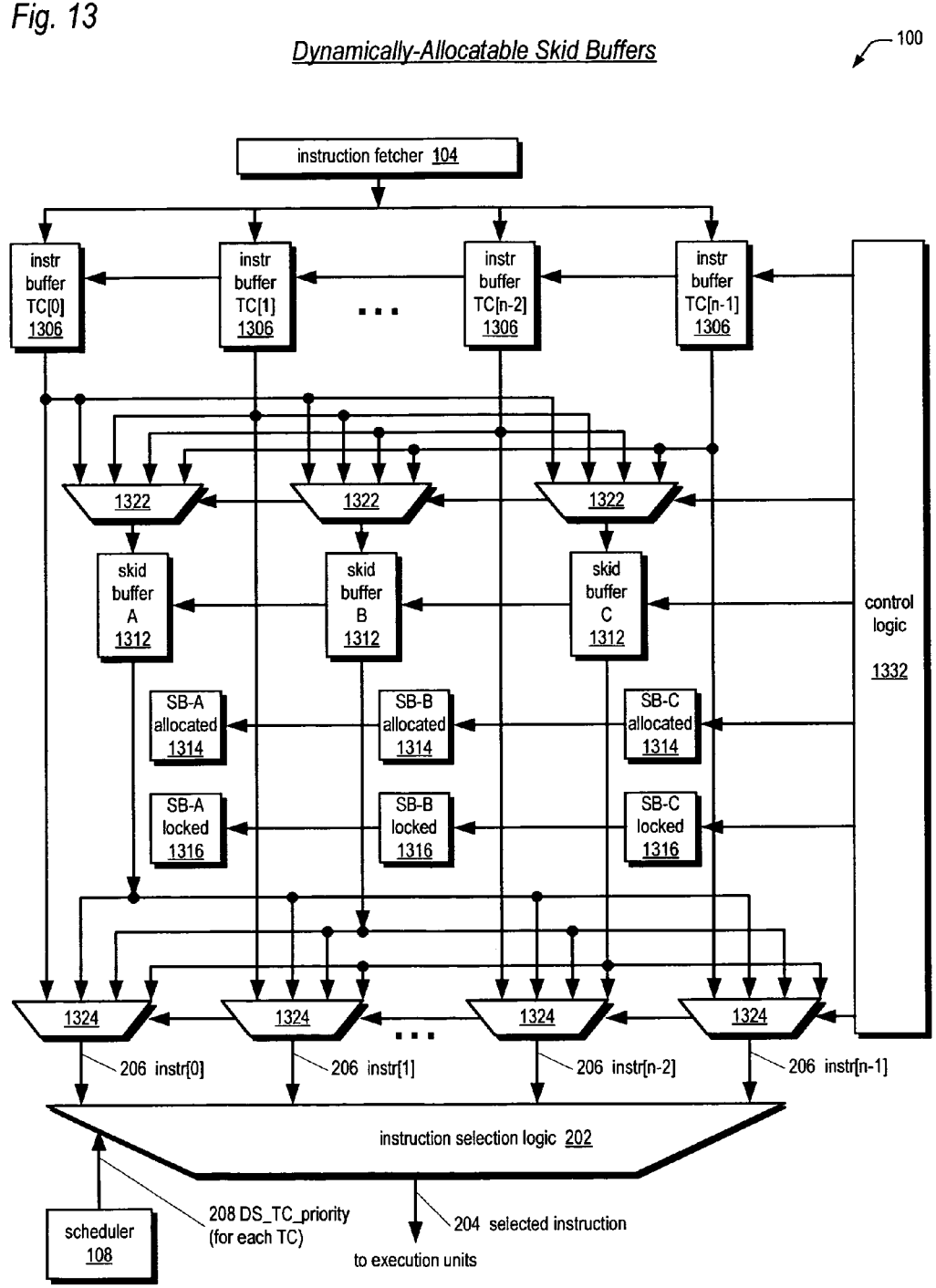
FIG. 13 is a block diagram illustrating shared dynamically-allocatable skid buffers of the microprocessor of FIG. 1 according to an alternate embodiment of the present invention.

Referring now to FIG. 13 a block diagram illustrating shared dynamically-allocatable skid buffers of the microprocessor 100 of FIG. 1 according to an alternate embodiment of the present invention is shown. The microprocessor 100 includes the instruction fetcher 104 and scheduler 108 of FIG. 1. The microprocessor 100 also includes the instruction selection logic 202 that outputs the selected instruction 204 in response to the DS_TC_priority signals 208 of FIG. 2. The microprocessor 100 also includes a plurality of instruction buffers 1306 for a plurality of respective thread contexts into which the instruction fetcher 104 of FIG. 1 fetches instructions. The microprocessor 100 also includes a plurality of skid buffers 1312. In one embodiment, each of the instruction buffers 1306 and skid buffers 1312 comprises a circular FIFO similar to the structure of the instruction/skid buffers 106 of FIG. 3. Advantageously, because the skid buffers 1312 are shared and dynamically allocated by the thread contexts, the number of skid buffers 1312 may be less than the number of thread contexts. FIG. 13 illustrates an embodiment having three skid buffers 1312, denoted skid buffer A, skid buffer B, and skid buffer C. Additionally, each skid buffer 1312 has an associated allocated register 1314 and locked register 1316. The allocated register 1314 indicates whether the associated skid buffer 1312 is allocated for use by a thread context and, if so, which of the thread contexts the skid buffer 1312 is allocated to. Similarly, the locked register 1316 indicates whether the associated skid buffer 1312 is locked for use by a thread context and, if so, which of the thread contexts the skid buffer 1312 is locked for. Allocating and locking skid buffers 1312 for thread contexts is discussed in more detail below with respect to FIG. 14.

The microprocessor 100 also includes a plurality of muxes 1322 associated with each of the skid buffers 1312. Each mux 1322 has its output coupled to the input of its associated skid buffer 1312. Each mux 1322 receives as its inputs the output of each of the instruction buffers 1306. The microprocessor 100 also includes a plurality of muxes 1324 associated with each of the instruction buffers 1306. Each mux 1324 outputs to the instruction selection logic 202 an instruction 206 of FIG. 2 of its respective thread context. Each mux 1324 receives on one input the output of its respective instruction buffer 1306. Each mux 1324 receives on its remaining inputs the output of each of the skid buffers 1312.

Unlike the instruction/skid buffers 106 of FIG. 2, the skid buffers 1312 of FIG. 13 are distinct from the instruction buffers 1306 and are shared and dynamically allocated by the thread contexts on an as-needed basis. This potentially provides a more efficient instruction buffering solution, particularly, a higher performance solution given the same amount of space and power, or a space and power reduction given a similar level of performance. The microprocessor 100 also includes buffer control logic 1332 for controlling the operation of the instruction buffers 1306, skid buffers 1312, muxes 1322 and 1324, allocated registers 1314, and locked registers 1316. Operation of the instruction buffers 1306 and skid buffers 1312 of FIG. 13 will now be described with respect to FIG. 14.

Figure 14:
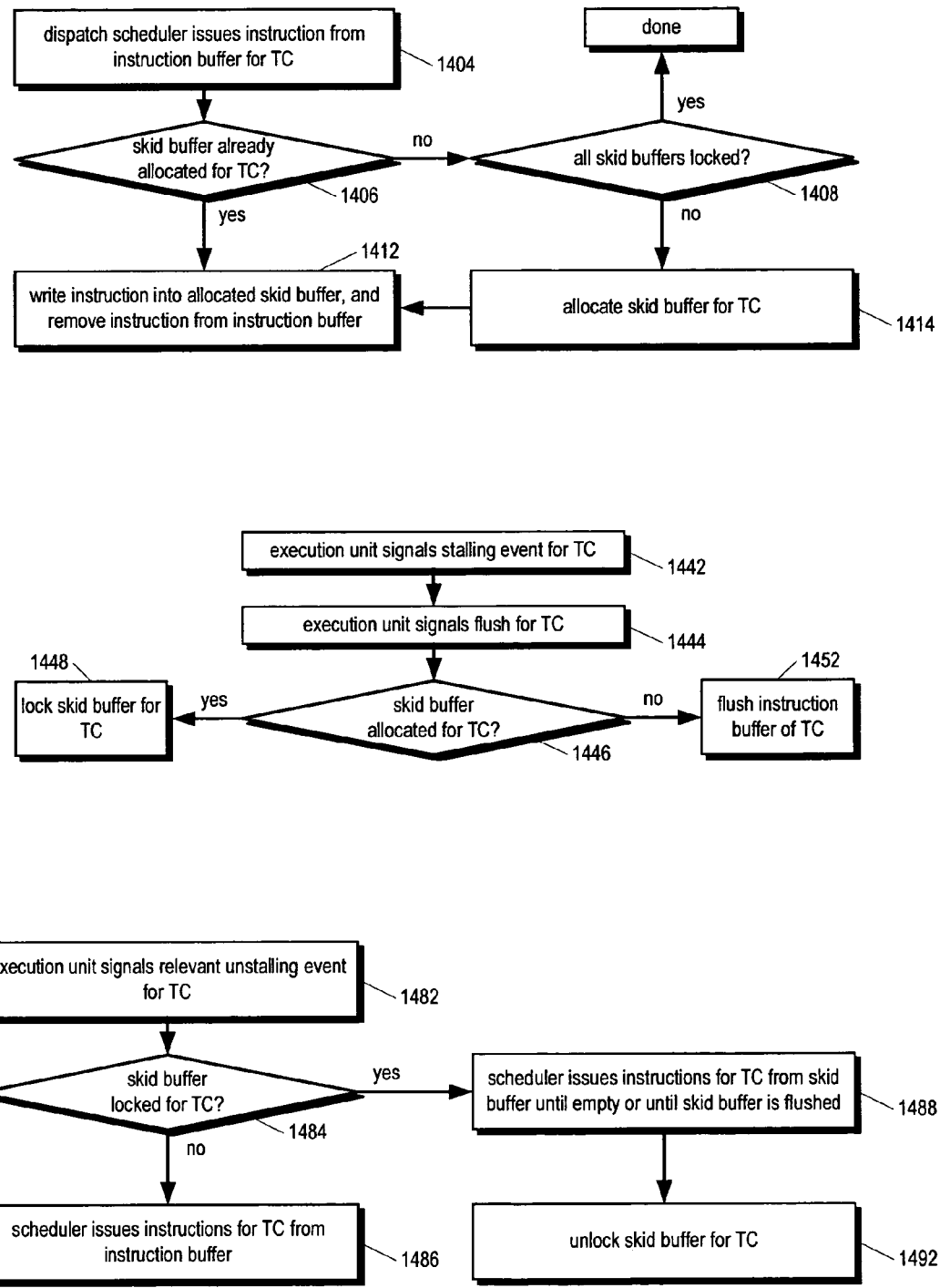
FIG. 14 is three flowcharts illustrating operation of the skid buffers of FIG. 13 according to the present invention.

Referring now to FIG. 14, three flowcharts illustrating operation of the skid buffers of FIG. 13 according to the present invention are shown. Each of the flowcharts illustrates actions performed by the instruction buffers 1306 and skid buffers 1312 of FIG. 13 in response to a different event or set of events. Flow of the first flowchart begins at block 1404.

At block 1404, the dispatch scheduler 602 of FIG. 6 issues an instruction from the instruction buffer 1306. It is noted that the instruction fetcher 104 is continuously writing instructions into the instruction buffer 1306 associated with a thread context, and in particular has written into the instruction buffer 1306 the instruction which is issued at block 1404. Flow proceeds to decision block 1406.

At decision block 1406, buffer control logic 1332 determines whether a skid buffer 1312 is already allocated for the thread context by reading the allocated registers 1314 of FIG. 13. If so, flow proceeds to block 1412; otherwise, flow proceeds to decision block 1408 to determine whether a skid buffer 1312 may be allocated for the thread context.

At decision block 1408, buffer control logic 1332 determines whether all skid buffers are locked by reading the locked registers 1316 of FIG. 13. If not, flow proceeds to block 1414; otherwise, flow ends since no skid buffer 1312 may be allocated for the thread context, which implies that if the thread context is subsequently flushed by the execution pipeline, the flushed instructions must be re-fetched.

At block 1412, the instruction dispatched at block 1404 is written into the skid buffer 1312 that was previously allocated for the thread context, and the instruction is removed from the instruction buffer 1306. Flow ends at block 1412.

At block 1414, buffer control logic 1332 allocates a skid buffer 1312 for the thread context. In one embodiment, the buffer control logic 1332 allocates a skid buffer 1312 for the thread context by writing the thread context identifier to the allocated register 1314 associated with the allocated skid buffer 1312. In one embodiment, the buffer control logic 1332 allocates the emptiest skid buffer 1312. In another embodiment, the buffer control logic 1332 allocates the skid buffers 1312 on a least recently used basis. In another embodiment, the buffer control logic 1332 allocates the skid buffers 1312 on a least recently unlocked basis. In another embodiment, the buffer control logic 1332 allocates the skid buffer 1312 whose thread context currently has the lowest priority. Flow proceeds from block 1414 to block 1412 to write the instruction into the allocated skid buffer 1312.

Flow of the second flowchart begins at block 1442.

At block 1442, an execution unit 114 of FIG. 1 signals a stalling event 126 for a thread context. Flow proceeds to block 1444.

At block 1444, the execution unit 114 signals a TC_flush 122 for the thread context. Flow proceeds to decision block 1446.

At decision block 1446, buffer control logic 1332 determines whether a skid buffer 1312 is allocated for the thread context by reading the allocated registers 1314 of FIG. 13. If not, flow proceeds to block 1452; otherwise, flow proceeds to block 1448.

At block 1448, buffer control logic 1332 locks the allocated skid buffer 1312 for the thread context. In one embodiment, the buffer control logic 1332 locks the skid buffer 1312 for the thread context by writing the thread context identifier to the locked register 1316 associated with the skid buffer 1312. Flow ends at block 1448.

At block 1452, the buffer control logic 1332 flushes the instruction buffer 1306 of the thread context flushed by the execution unit 114. Flow ends at block 1452.

Flow of the third flowchart begins at block 1482.

At block 1482, an execution unit 114 signals a relevant unstalling event 128 for a thread context. Flow proceeds to decision block 1484.

At decision block 1484, buffer control logic 1332 determines whether a skid buffer 1312 is locked for the thread context by reading the locked registers 1316. If so, flow proceeds to block 1488; otherwise, flow proceeds to block 1486.

At block 1486, the scheduler 108 issues instructions for the thread context from the instruction buffer 1306 associated with the thread context. It is noted that these instructions had to be re-fetched into the instruction buffer 1306 since no skid buffer 1312 was locked for the thread context. Flow ends at block 1486.

At block 1488, the scheduler 108 issues instructions for the thread context from the skid buffer 1312 locked for the thread context at block 1448 of the second flowchart until the skid buffer 1312 is empty or until the skid buffer 1312 is flushed, for example, in response to an exception or interrupt or branch misprediction correction. It is noted that these instructions advantageously did not have to be re-fetched. Flow proceeds to block 1492.

At block 1492, the buffer control logic 1332 unlocks the skid buffer 1312 that was locked for the thread context at block 1448 of the second flowchart. Flow ends at block 1492.

Figure 15:
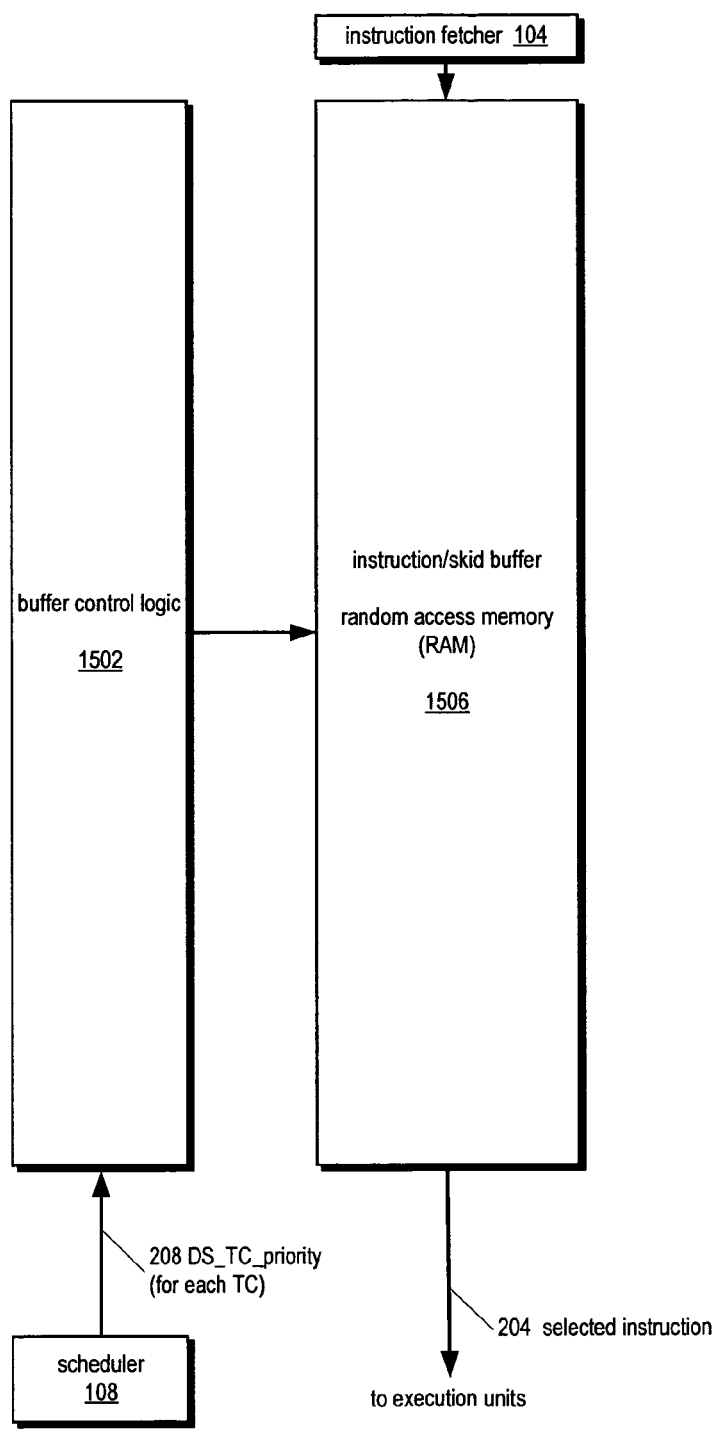
FIG. 15 is a block diagram illustrating a single shared instruction/skid buffer of the microprocessor of FIG. 1 according to an alternate embodiment of the present invention.

Referring now to FIG. 15, a block diagram illustrating a single instruction/skid buffer of the microprocessor 100 of FIG. 1 that is shared by all the thread contexts according to an alternate embodiment of the present invention is shown. The microprocessor 100 of FIG. 15 includes the instruction fetcher 104 and scheduler 108 of FIG. 1. The microprocessor 100 also includes a single instruction/skid buffer 1506 into which the instruction fetcher 104 fetches instructions for all thread contexts. The microprocessor 100 also includes buffer control logic 1502 that receives the DS_TC_priority signals 208 of FIG. 2 from the scheduler 108. The buffer control logic 1502 controls the instruction/skid buffer 1506 to output the selected instruction 204 of FIG. 2 for provision to the execution units 114.

The single instruction/skid buffer 1506 of FIG. 15 is a random access memory (RAM) for storing instructions from all the thread contexts. Consequently, the buffer control logic 1502 maintains a single write pointer (WP) and full_count across all thread contexts that function similar to those described above with respect to FIG. 3. In particular, the write pointer specifies the address of the next location in the RAM 1506 to be written regardless of the thread context of the instruction. Similarly, the full_count is incremented each time an instruction is written into the RAM 1506 and decremented each time an instruction has been committed for execution regardless of the thread context of the instruction.

In contrast, the buffer control logic 1502 maintains a separate read pointer (RP), commit pointer (CP), and empty_count for each thread context similar to those described above with respect to FIG. 3. In particular, the read pointer specifies the address of the next location in the RAM 1506 to be read for the respective thread context; the commit pointer indicates the address of the location in the RAM 1506 of the next instruction to be committed for the respective thread context; and the empty_count is incremented each time an instruction is written into the RAM 1506 for the respective thread context and decremented each time the scheduler 108 reads an instruction from the RAM 1506 for the respective thread context.

In one embodiment, the buffer control logic 1502 maintains a linked-list for each thread context that specifies the locations within the RAM 1506 of the valid instructions for the thread context in the order in which the instructions were fetched into the RAM 1506. The linked list is updated each time an instruction is written into the RAM 1506 and is used to update the read pointer and commit pointer for each thread context.

The buffer control logic 1502 receives the DS_TC_priority signals 208 from the scheduler 108 when the scheduler 108 requests an instruction, and the buffer control logic 1502 responsively selects one of the thread contexts for instruction dispatch and generates the appropriate address to the RAM 1506 to cause the RAM 1506 to output the instruction 204 of the thread context with the highest priority indicated by the DS_TC_priority signals 208.

Although the present invention and its objects, features, and advantages have been described in detail, other embodiments are encompassed by the invention. For example, although embodiments have been described in which the scheduler 108 is bifurcated and in which the parameterized leaky-bucket scheduling policy is included in the portion of the scheduler 108 outside the processor core 606, i.e., outside the customer-modifiable portion of the processor 100, it should be understood that employing a parameterized leaky-bucket scheduler is not limited to a bifurcated scheduler, but may be adapted to a non-bifurcated scheduler, as well as to a scheduler partitioned in any of various manners. In addition, although a bifurcated scheduler has been described in which the policy manager 604 enforces a leaky-bucket scheduling policy, the bifurcated scheduler 108 is not limited to a leaky-bucket thread scheduling policy; rather, the thread scheduling policy enforced by the policy manager of the bifurcated scheduler may be according to any thread scheduling algorithm. Still further, although an embodiment has been described in which the policy manager 604 updates the thread context priorities based on an indication that an instruction has been committed for execution, in other embodiments the policy manager 604 may update the thread context priorities based on other information from the processor core 606, such as an indication that an instruction has been issued (such as indicated by the PM_TC_inst_issued signals 646), an indication that an instruction has been completed or retired from the microprocessor 100, or some other instruction execution-related indication. Additionally, although a particular calculation has been described for employing the TC_RATE 912 to update the TC_LEVEL 918, the TC_LEVEL 918 may be updated according to other manners using the TC_RATE 912.

While various embodiments of the present invention have been described above, it should be understood that they have been presented by way of example, and not limitation. It will be apparent to persons skilled in the relevant computer arts that various changes in form and detail can be made therein without departing from the spirit and scope of the invention.

For example, in addition to using hardware (e.g., within or coupled to a Central Processing Unit ("CPU"), microprocessor, microcontroller, digital signal processor, processor core, System on Chip ("SOC"), or any other programmable device), implementations may also be embodied in software (e.g., computer readable code, program code, instructions and/or data disposed in any form, such as source, object or machine language) disposed, for example, in a computer usable (e.g., readable) medium configured to store the software. Such software can enable, for example, the function, fabrication, modeling, simulation, description and/or testing of the apparatus and methods described herein. For example, this can be accomplished through the use of general programming languages (e.g., C, C++), GDSII databases, hardware description languages (HDL) including Verilog HDL, VHDL, and so on, or other available programs, databases, and/or circuit (i.e., schematic) capture tools. Such software can be disposed in any known computer usable medium including semiconductor, magnetic disk, optical disc (e.g., CD-ROM, DVD-ROM, etc.) and as a computer data signal embodied in a computer usable (e.g., readable) transmission medium (e.g., carrier wave or any other medium including digital, optical, or analog-based medium). As such, the software can be transmitted over communication networks including the Internet and intranets.

It is understood that the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalents.

We claim:

1. A bifurcated scheduler for dispatching instructions in a multithreading processor configured to concurrently execute a plurality of threads, the scheduler comprising:
    first scheduler logic, configured to issue instructions of the plurality of threads to at least one execution unit of the processor;
    second scheduler logic, for enforcing a scheduling policy of the plurality of threads, wherein said second scheduler logic comprises a plurality of customer-modifiable registers; and
    an interface, coupling said second scheduler logic to the first scheduler logic and to said at least one execution unit, said interface comprising:
        first signal lines, for said first scheduler logic to receive from said second scheduler logic a priority for each of the plurality of threads, wherein said first scheduler logic issues said instructions to said at least one execution unit based on said priorities; and
        second signal lines, for said second scheduler logic to receive instruction execution information for each of the plurality of threads, wherein said second scheduler logic updates said priorities based on said instruction execution information, wherein said execution information indicates when said at least one execution unit executes an instruction for each of the plurality of threads.

2. The scheduler of claim 1, wherein each clock cycle said first scheduler logic selects which of the plurality of threads to issue said instructions to said at least one execution unit, based on said priorities.

3. The scheduler of claim 2, wherein each clock cycle said first scheduler logic selects one of the plurality of threads to issue said instructions to said at least one execution unit, based on said priorities.

4. The scheduler of claim 2, wherein each clock cycle said first scheduler logic selects more than one of the plurality of threads to issue said instructions to said at least one execution unit, based on said priorities.

5. The scheduler of claim 1, wherein said interface further comprises:
    third signal lines, for said second scheduler logic to receive from said first scheduler logic status information for each of the plurality of threads, wherein said second scheduler logic updates said priorities based on said status information.

6. The scheduler of claim 5, wherein said status information comprises an indication of whether said first scheduler logic is blocked from issuing instructions for each of the plurality of threads.

7. The scheduler of claim 1, wherein said priority of each of the plurality of threads comprises one of a plurality of predetermined priority levels.

8. The scheduler of claim 1, wherein said instruction execution information comprises an indication of which of the plurality of threads an instruction was committed for execution, provided by said at least one execution unit.

9. The scheduler of claim 1, wherein said instruction execution information comprises an indication of which of the plurality of threads an instruction was completed, provided by said at least one execution unit.

10. The scheduler of claim 1, further comprising:
    third signal lines, for said second scheduler logic to receive instruction issue information for each of the plurality of threads, wherein said second scheduler logic updates said priorities based on said instruction issue information, wherein said issue information indicates when said first scheduler logic issues an instruction for each of the plurality of threads.

11. The scheduler of claim 1, wherein said first scheduler logic is non-customer-modifiable.

12. The scheduler of claim 1, wherein said second scheduler logic is customer-modifiable.

13. The scheduler of claim 1, wherein each of the plurality of threads comprises an instruction stream.

14. The scheduler of claim 13, wherein the processor further comprises:
    a set of storage elements, associated with each of the plurality of threads, for storing a state of execution of said instruction stream.

15. The scheduler of claim 14, wherein each of said set of storage elements comprises:
    a program counter.

16. The scheduler of claim 15, wherein each of said set of storage elements further comprises:
    a general purpose register set.

17. The scheduler of claim 1, wherein the processor includes a processor core, wherein said processor core includes said first scheduler logic and excludes said second scheduler logic.

18. The scheduler of claim 17, wherein said processor core is synthesizable.

19. The scheduler of claim 17, wherein said processor core is reusable for a plurality of customers.

20. The scheduler of claim 1, wherein said first scheduler logic is configured to select at least one of the plurality of threads for which an issuable instruction has been fetched by the processor, and which has a highest priority specified by said priorities, from which to issue an instruction.

21. The scheduler of claim 20, wherein if the processor has fetched an issuable instruction for more than one of the plurality of threads, each having said highest priority, said first scheduler logic is configured to select one of said more than one of the plurality of threads in a round-robin manner.

22. The scheduler of claim 20, further comprising:
logic for checking register dependencies of said fetched issuable instructions of the plurality of threads, wherein if more than one of the plurality of threads has said highest priority, said first scheduler logic is configured to select one of said more than one of the plurality of threads based on said register dependencies.

23. The scheduler of claim 22, wherein if the processor has fetched an issuable instruction for more than one of the plurality of threads, each having a highest priority and equal said register dependencies, said first scheduler logic is configured to select one of said more than one of the plurality of threads in a round-robin manner.

24. The scheduler of claim 1, wherein said interface further comprises:
third signal lines, for said second scheduler logic to communicate to said first scheduler logic for each of the plurality of threads whether to block issuing of instructions for the thread.

25. The scheduler of claim 1, wherein said interface further comprises:
a clock signal line, from said first scheduler logic to said second scheduler logic.

26. A multithreading processor, comprising:
thread scheduling policy logic, configured to enforce a policy for scheduling instruction dispatch of a plurality of threads concurrently executed by the processor, wherein said thread scheduling policy logic comprises a plurality of customer-modifiable registers;
a processor core, coupled to said thread scheduling policy logic, comprising:
at least one execution pipeline, for executing instructions; and
an instruction dispatcher, coupled to dispatch instructions of said plurality of threads to said execution pipeline based on said policy received from said thread scheduling policy logic; and
an interface, for coupling said thread scheduling policy logic and said processor core, comprising:
priority signal lines, for said thread scheduling policy logic to communicate to said instruction dispatcher a dispatch priority for each of the plurality of threads, to enforce said policy; and
execution signal lines, for said at least one execution pipeline to communicate to said thread scheduling policy logic for each of said plurality of threads an indication of whether said at least one execution pipeline executed an instruction for the thread.

27. The processor of claim 26, wherein said thread scheduling policy logic is physically external to said processor core.

28. The processor of claim 26, wherein said thread scheduling policy logic is customer-modifiable and said processor core is non-customer-modifiable.

29. The processor of claim 26, wherein said instruction dispatcher is configured to select for issuing an instruction at least one of said plurality of threads for which an issuable instruction has been fetched by the processor, and which has a highest priority specified by said priorities.

30. The processor of claim 29, wherein if the processor has fetched an issuable instruction for more than one of the plurality of threads, each having a highest priority, said instruction dispatcher is configured to select one of said more than one of said plurality of threads in a round-robin manner.

31. The processor of claim 29, further comprising:
logic for checking register dependencies of said fetched issuable instructions of said plurality of threads, wherein if more than one of said plurality of threads has said highest priority, said instruction dispatcher is configured to select one of said more than one of said plurality of threads based on said register dependencies.

32. The processor of claim 31, wherein if the processor has fetched an issuable instruction for more than one of the plurality of threads, each having a highest priority and equal said register dependencies, said instruction dispatcher is configured to select one of said more than one of said plurality of threads in a round-robin manner.

33. The processor of claim 26, wherein a computer program product comprising a computer usable medium having computer readable program code causes the processor, wherein said computer program product is for use with a computing device.

34. The processor of claim 26, wherein a computer data signal embodied in a transmission medium comprising computer-readable program code provides the processor.

35. A thread scheduling policy manager for enforcing a thread scheduling policy of a multithreading processor that concurrently executes a plurality of threads, the policy manager comprising:
inputs, for receiving, each processor clock cycle, an indication of whether an instruction was executed for each of the plurality of threads;
outputs, for transmitting, each processor clock cycle, an instruction dispatch priority for each of the plurality of threads; and
logic, coupled to said inputs, for generating said outputs based on said inputs to enforce the thread scheduling policy,
wherein the thread scheduling policy manager comprises a plurality of customer-modifiable registers.

36. The policy manager of claim 35, wherein said indication of whether an instruction was executed indicates whether said instruction was dispatched for execution.

37. The policy manager of claim 35, wherein said indication of whether an instruction was executed indicates whether said instruction was committed for execution.

38. The policy manager of claim 35, wherein said indication of whether an instruction was executed indicates whether execution of said instruction was completed.

39. The policy manager of claim 35, wherein said priority of each of the plurality of threads comprises one of a plurality of predetermined priority levels.

40. The policy manager of claim 35, further comprising:
second outputs, for transmitting, each processor clock cycle, an indication whether to block issuing instructions for each of the plurality of threads.

41. The policy manager of claim 35, further comprising:
second inputs, for receiving, each processor clock cycle, a state for each of the plurality of threads, said state indicating whether said thread is currently blocked from having instructions issued therefrom;
wherein said logic is further configured to generate said outputs to enforce the thread scheduling policy based on said first and second inputs.

42. The policy manager of claim 35, wherein said priority of each of the plurality of threads comprises one of a plurality of predetermined priority levels.

43. A multithreading processor core configured to concurrently execute a plurality of threads, each of the plurality of threads comprising a stream of instructions, the processor core comprising:
an interface, for coupling the processor core to thread scheduling policy logic external to the processor core, said interface comprising:
first signal lines, for the thread scheduling policy logic to communicate to the processor core a priority of each of the plurality of threads, wherein the thread scheduling policy logic comprises a plurality of customer-modifiable registers; and
second signal lines, for the thread scheduling policy logic to receive from the processor core information for each of the plurality of threads indicating instructions of the threads were executed, for use by the thread scheduling policy logic to update said priorities; and
a scheduler, coupled to receive said first signal lines and to select at least one instruction from at least one of the plurality of threads to issue for execution, based on said priorities received on said first signal lines.

44. The processor core of claim 43, wherein said scheduler is configured to select said at least one instruction each clock cycle of the processor core.

45. The processor core of claim 43, wherein said information comprises an indication that the processor core has committed for execution an instruction of a specified one of the plurality of threads.

46. The processor core of claim 45, wherein the processor core has committed for execution said instruction if said instruction is guaranteed not to be flushed from the processor.

47. The processor core of claim 45, wherein the processor core has committed for execution said instruction if said instruction is guaranteed to be completed by the processor.

48. The processor core of claim 43, wherein said information comprises an indication that the processor core has completed an instruction of a specified one of the plurality of threads.

49. The processor core of claim 43, further comprising:
third signal lines, for the thread scheduling policy logic to receive from the processor core information for each of the plurality of threads indicating instructions of the threads were issued, for use by the thread scheduling policy logic to update said priorities.

50. The processor core of claim 43, wherein said interface further comprises:
third signal lines, for the thread scheduling policy logic to receive from the processor core state information for specifying a state of each of the plurality of threads, for use by the thread scheduling policy logic to update said priorities.

51. The processor core of claim 40, wherein said state information comprises an indication of whether each of the plurality of threads is blocked for said scheduler to issue instructions from the thread for execution.

52. The processor core of claim 43, wherein said interface further comprises:
third signal lines, for the thread scheduling policy logic to communicate to said scheduler for each of the plurality of threads whether to block issuing of instructions for the thread.

53. The processor core of claim 43, wherein said scheduler is configured to select said at least one instruction from said at least one of the plurality of threads to attempt to keep an execution pipeline of the processor core full of instructions for causing said execution pipeline to be efficient.

54. The processor core of claim 43, wherein said scheduler is configured to select said at least one of the plurality of threads for which an issuable instruction has been fetched by the processor, and which has a highest priority specified by said priorities.

55. The processor core of claim 54, wherein if more than one of the plurality of threads has a fetched issuable instruction and said highest priority, said scheduler is configured to select one of said more than one of the plurality of threads in a round-robin manner.

56. The processor core of claim 54, further comprising:
logic for checking register dependencies of a fetched issuable instructions of the plurality of threads, wherein if more than one of the plurality of threads has said highest priority, said scheduler is configured to select one of said more than one of the plurality of threads based on said register dependencies.

57. The processor core of claim 56, wherein if more than one of the plurality of threads has a fetched issuable instruction and said highest priority and equal said register dependencies, said scheduler is configured to select one of said more than one of the plurality of threads in a round-robin manner.

58. The processor core of claim 43, wherein said priority of each of the plurality of threads comprises one of a plurality of predetermined priority levels.

59. The processor core of claim 43, wherein the processor core comprises a reusable non-customer-modifiable core.

60. The processor core of claim 43, wherein the processor core is synthesizable.

61. The processor core of claim 43, wherein said interface further comprises:
a clock signal line, from said scheduler to said thread scheduling policy logic.

62. A method for scheduling a plurality of concurrently executing threads in a multithreading processor, the method comprising:
signaling by execution logic to thread scheduling policy logic an indication whether the execution logic executed an instruction for each of the plurality of threads, during a first clock cycle, wherein the thread scheduling policy logic comprises a plurality of customer-modifiable registers;
signaling by the thread scheduling policy logic to instruction dispatch logic a thread scheduling priority for each of the plurality of threads, during a second clock cycle, in response to said signaling by execution logic to thread scheduling policy logic the indication; and
dispatching by the instruction dispatch logic at least one instruction from the plurality of threads for execution, during a third clock cycle, in response to said signaling the priorities.

63. The method of claim 62, wherein said indication indicates whether the execution logic committed the instruction for execution.

64. The method of claim 62, wherein said indication indicates whether the instruction was dispatched to the execution logic for execution.

65. The method of claim 62, wherein the indication indicates whether execution of the instruction was completed.

66. The method of claim 62, further comprising:
signaling by the thread scheduling policy logic to the instruction dispatch logic a second thread scheduling priority for each of the plurality of threads, during a fourth clock cycle, in response to a second instance of said signaling by the execution logic to the thread scheduling policy logic the indication.

67. The method of claim 62, further comprising:
signaling by the instruction dispatch logic to the thread scheduling policy logic a state of each of the plurality of threads, prior to said first clock cycle; and
said signaling by the thread scheduling policy logic to the instruction dispatch logic the thread scheduling priority for each of the plurality of threads, during the first clock cycle, in response to said signaling by the instruction dispatch logic to the thread scheduling policy logic the state of each of the plurality of threads.

68. The method of claim 62, further comprising:
signaling by the thread scheduling policy logic to the instruction dispatch logic an indication for each of the plurality of threads whether to block dispatching instructions for the thread; and
stopping said dispatching by the instruction dispatch logic instructions from each of the plurality of threads signaled by the thread scheduling policy logic to block dispatching instructions.

69. The method of claim 62, wherein the thread scheduling policy logic is customized by a customer, wherein the instruction dispatch logic is reusable for a plurality of customers.

70. The method of claim 62, wherein the thread scheduling policy logic is external to a core of the processor and the instruction dispatch logic is internal to the core.

71. A computer program product for use with a computing device, the computer program product comprising:
a computer usable medium, having computer readable program code embodied in said medium, for causing a bifurcated scheduler for dispatching instructions in a multithreading processor configured to concurrently execute a plurality of threads, said computer readable program code comprising:
first program code for providing first scheduler logic, configured to issue instructions of the plurality of threads to at least one execution unit of the processor;
second program code for providing second scheduler logic, for enforcing a scheduling policy of the plurality of threads, wherein said second scheduler logic comprises a plurality of customer-modifiable registers; and
third program code for providing an interface, coupling said second scheduler logic to the first scheduler logic and to said at least one execution unit, said interface comprising:
first signal lines, for said first scheduler logic to receive from said second scheduler logic a priority for each of the plurality of threads, wherein said first scheduler logic issues said instructions to said at least one execution unit based on said priorities; and
second signal lines, for said second scheduler logic to receive instruction execution information for each of the plurality of threads, wherein said second scheduler logic updates said priorities based on said instruction execution information, wherein said execution information indicates when said at least one execution unit executes an instruction for each of the plurality of threads.

72. The computer program product of claim 71, wherein said computer readable program code further comprises:
fourth program code for providing third signal lines, for said second scheduler logic to receive from said first scheduler logic status information for each of the plurality of threads, wherein said second scheduler logic updates said priorities based on said status information.

73. A computer program product for use with a computing device, the computer program product comprising:
a computer usable medium, having computer readable program code embodied in said medium, for causing a multithreading processor, said computer readable program code comprising:
first program code for providing thread scheduling policy logic, configured to enforce a policy for scheduling instruction dispatch of a plurality of threads concurrently executed by the processor, wherein said thread scheduling policy logic comprises a plurality of customer-modifiable registers;
second program code for providing a processor core, coupled to said thread scheduling policy logic, comprising:
at least one execution pipeline, for executing instructions; and
an instruction dispatcher, coupled to dispatch instructions of said plurality of threads to said execution pipeline based on said policy received from said thread scheduling policy logic; and
an interface, for coupling said thread scheduling policy logic and said processor core, comprising:
priority signal lines, for said thread scheduling policy logic to communicate to said instruction dispatcher a dispatch priority for each of the plurality of threads, to enforce said policy; and
execution signal lines, for said at least one execution pipeline to communicate to said thread scheduling policy logic for each of said plurality of threads an indication of whether said at least one execution pipeline executed an instruction for the thread.

74. The computer program product of claim 73, wherein said computer readable program code further comprises:
third program code for providing said instruction dispatcher, wherein said instruction dispatcher is configured to select for issuing an instruction at least one of said plurality of threads for which an issuable instruction has been fetched by the processor, and which has a highest priority specified by said priorities.

75. A computer program product for use with a computing device, the computer program product comprising:
a computer usable medium, having computer readable program code embodied in said medium, for causing a thread scheduling policy manager for enforcing a thread scheduling policy of a multithreading processor that concurrently executes a plurality of threads, said computer readable program code comprising:
first program code for providing inputs, for receiving, each processor clock cycle, an indication of whether an instruction was executed for each of the plurality of threads;
second program code for providing outputs, for transmitting, each processor clock cycle, an instruction dispatch priority for each of the plurality of threads; and third program code for providing logic, coupled to said inputs, for generating said outputs based on said inputs to enforce the thread scheduling policy, wherein the thread scheduling policy manager comprises a plurality of customer-modifiable registers.

76. The computer program product of claim 75, wherein said computer readable program code further comprises:

fourth program code for providing said logic, wherein said priority of each of the plurality of threads comprises one of a plurality of predetermined priority levels.

77. A computer program product for use with a computing device, the computer program product comprising:

a computer usable medium, having computer readable program code embodied in said medium, for causing a multithreading processor core configured to concurrently execute a plurality of threads, each of the plurality of threads comprising a stream of instructions, said computer readable program code comprising:

first program code for providing an interface, for coupling the processor core to thread scheduling policy logic external to the processor core, said interface comprising:

first signal lines, for the thread scheduling policy logic to communicate to the processor core a priority of each of the plurality of threads, wherein the thread scheduling policy logic comprises a plurality of customer-modifiable registers; and second signal lines, for the thread scheduling policy logic to receive from the processor core information for each of the plurality of threads indicating instructions of the threads were executed, for use by the thread scheduling policy logic to update said priorities; and second program code for providing a scheduler, coupled to receive said first signal lines and to select at least one instruction from at least one of the plurality of threads to issue for execution, based on said priorities received on said first signal lines.

78. The computer program product of claim 77, wherein said computer readable program code further comprises:

third program code for providing said interface, wherein said information comprises an indication that the processor core has committed for execution an instruction of a specified one of the plurality of threads.

79. An interface between a processor core and thread scheduling policy logic for enabling the policy logic to enforce a policy for scheduling the concurrent dispatch of a plurality of threads by the processor core, the interface comprising:

priority signal lines, for the thread scheduling policy logic to communicate a dispatch priority for each of the plurality of threads to an instruction dispatcher of the processor core, wherein said thread scheduling policy logic comprises a plurality of customer-modifiable registers; and feedback signal lines, for an execution pipeline of the processor core to communicate to the thread scheduling policy logic for each of the plurality of threads an indication of whether the execution pipeline executed an instruction for the thread.

80. The interface of claim 79, wherein said feedback signal lines communicate an indication of whether the dispatcher dispatched an instruction for the thread, rather than whether the execution pipeline executed an instruction for the thread.

81. The interface of claim 79, further comprising:

a clock signal line, for the processor core to communicate a clock signal to the thread scheduling policy logic.

82. The interface of claim 79, further comprising:

status signal lines, for the processor core to communicate to the thread scheduling policy logic a status for each of the plurality of threads.

83. The interface of claim 62, wherein said status signal lines indicate whether the thread is currently blocked for instruction dispatch.

84. The interface of claim 79, further comprising:

blocking signal lines, for the thread scheduling policy logic to communicate to the processor core a command to stop dispatching instructions for each of the plurality of threads.

85. The interface of claim 79, wherein the processor core comprises a plurality of virtual processing elements, the interface further comprising:

status signal lines, for the processor core to communicate to the thread scheduling policy logic a status for each of said virtual processing elements.

86. The interface of claim 79, further comprising:

fork signal lines, for the processor core to communicate to the thread scheduling policy logic that the processor core has created a new thread.

87. The interface of claim 86, wherein said feedback signal lines indicate which of the plurality of threads created said new thread.

88. The interface of claim 79, further comprising:

control signal lines, for the processor core to read and write control/status registers of the thread scheduling policy logic.

89. The interface of claim 88, wherein said control/status registers comprise Coprocessor 0 registers defined by a MIPS Privileged Resource Architecture (PRA) and a MIPS Multithreading Application Specific Extension (MT ASE).

90. The interface of claim 79, wherein said priority signal lines communicate a dispatch priority for an exception handling thread.

91. The interface of claim 79, wherein said priority signal lines communicate a dispatch priority for a relax thread, wherein said relax thread is a virtual thread for enabling the thread scheduling policy logic to communicate to the processor core to save power consumption by not utilizing the full execution bandwidth of the execution pipeline.

* * * * *